(12) United States Patent
Pollack et al.

(10) Patent No.: US 9,451,425 B2
(45) Date of Patent: Sep. 20, 2016

(54) UNIFIED MESSAGE DELIVERY BETWEEN PORTABLE ELECTRONIC DEVICES

(71) Applicant: Apple Inc., Cupertino, CA (US)

(72) Inventors: Daniel B. Pollack, San Francisco, CA (US); Pierre Jonathan De Filippis, San Jose, CA (US); Hyeonkuk Jeong, Saratoga, CA (US); Berkat S. Tung, San Jose, CA (US); Yan Yang, San Jose, CA (US); Gobind Johar, San Jose, CA (US); Justin Wood, Sunnyvale, CA (US); Roberto Garcia, Santa Clara, CA (US); Gokul Thirumalai, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/475,236

(22) Filed: Sep. 2, 2014

(65) Prior Publication Data

US 2015/0350854 A1 Dec. 3, 2015

Related U.S. Application Data

(60) Provisional application No. 62/005,715, filed on May 30, 2014.

(51) Int. Cl.
*H04W 4/00* (2009.01)
*H04W 4/12* (2009.01)
(Continued)

(52) U.S. Cl.
CPC ............... *H04W 4/12* (2013.01); *H04L 45/22* (2013.01); *H04L 45/28* (2013.01); *H04W 40/02* (2013.01); *H04W 4/008* (2013.01); *H04W 84/12* (2013.01); *H04W 88/04* (2013.01)

(58) Field of Classification Search
CPC ....... H04W 4/10; H04W 4/12; H04W 4/008; H04W 40/02; H04W 84/12; H04W 88/04; H04L 45/22; H04L 45/28

USPC ........................................................ 455/466
See application file for complete search history.

(56) References Cited

U.S. PATENT DOCUMENTS 5,483,261 A   1/1996   Yasutake
5,488,204 A   1/1996   Mead et al.
(Continued)

FOREIGN PATENT DOCUMENTS

| JP | 2000-163031 A | 6/2000 | |
|---|---|---|---|
| JP | 2002-342033 A | 11/2002 | |
| WO | WO 2015050544 A1 * | 4/2015 | ............ H04W 48/18 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sam K Ahn
*Assistant Examiner* — Fabricio R Murillo Garcia
(74) *Attorney, Agent, or Firm* — Morrison & Foerster LLP

(57) ABSTRACT

A unified message delivery between multiple devices is disclosed. Sending messages through a local communications link, such as but not limited to at least one of a Bluetooth connection and a peer-to-peer WiFi connection, can lead to faster transmission times and reduced server load. When the local communications link is unavailable or not suitable, the messages can be sent through a network and a push server. In some examples, messages can be sent through both the local communications link and through the network and the push server. Duplicates of a received message can be avoided by utilizing indicators. In some examples, one or more devices can include queue(s) to ensure ordered delivery of a plurality of messages when a local communications link and network connection become unavailable.

20 Claims, 14 Drawing Sheets

(51) Int. Cl.
*H04W 40/02* (2009.01)
*H04L 12/707* (2013.01)
*H04L 12/703* (2013.01)
*H04W 84/12* (2009.01)
*H04W 88/04* (2009.01)

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0025122 A1* | 2/2006 | Harris ............. H04W 4/16 455/419 |
| 2006/0197753 A1 | 9/2006 | Hotelling |
| 2008/0075115 A1* | 3/2008 | Brendes et al. ............. 370/467 |
| 2010/0159948 A1* | 6/2010 | Spivey ............. H04L 12/10 455/456.1 |
| 2013/0281020 A1* | 10/2013 | Montemurro ............. 455/41.2 |

OTHER PUBLICATIONS

PCT Application No. PCT/US2013/063138, filed Oct. 2, 2013, entitled "Cloud Phone Notifications".

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

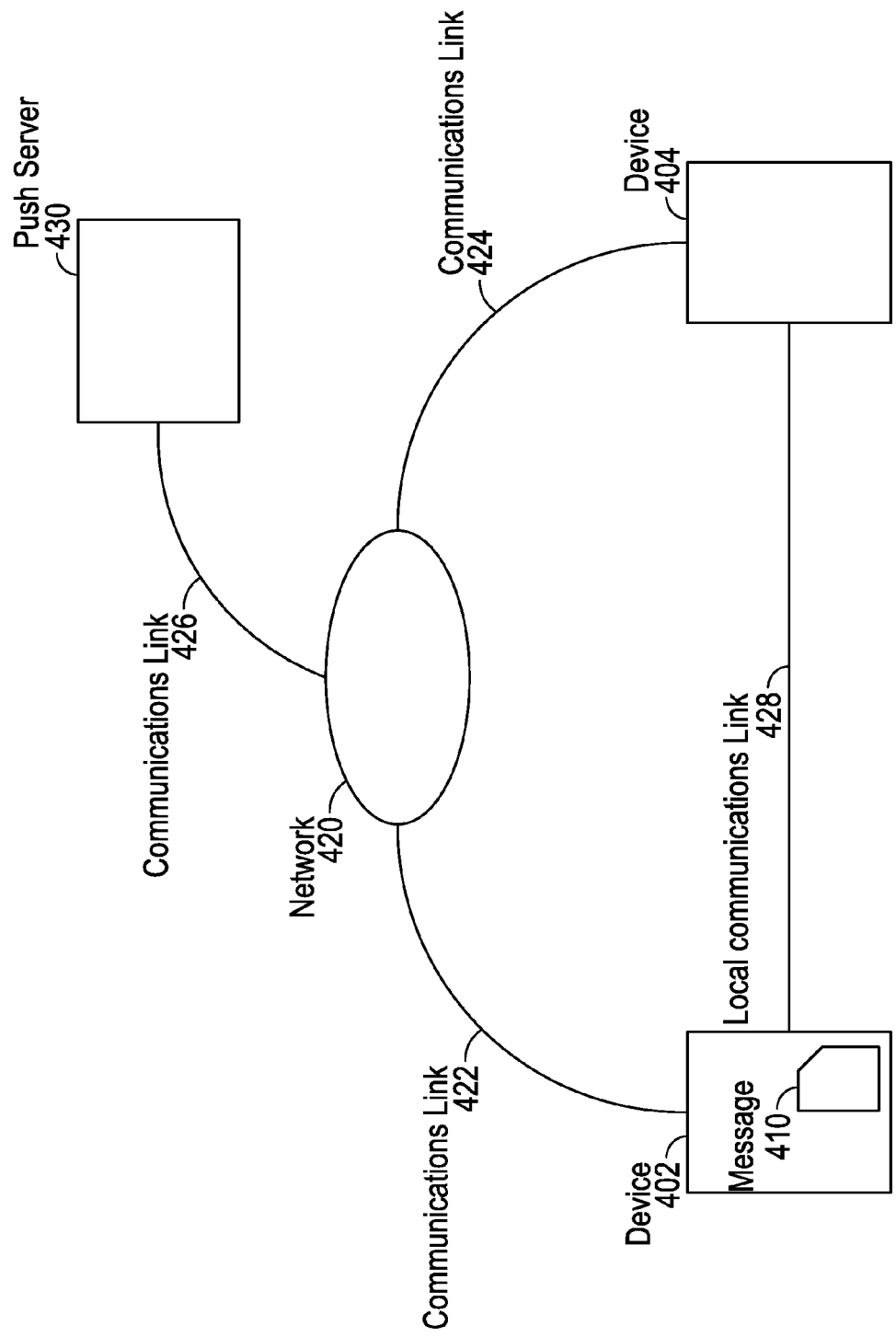

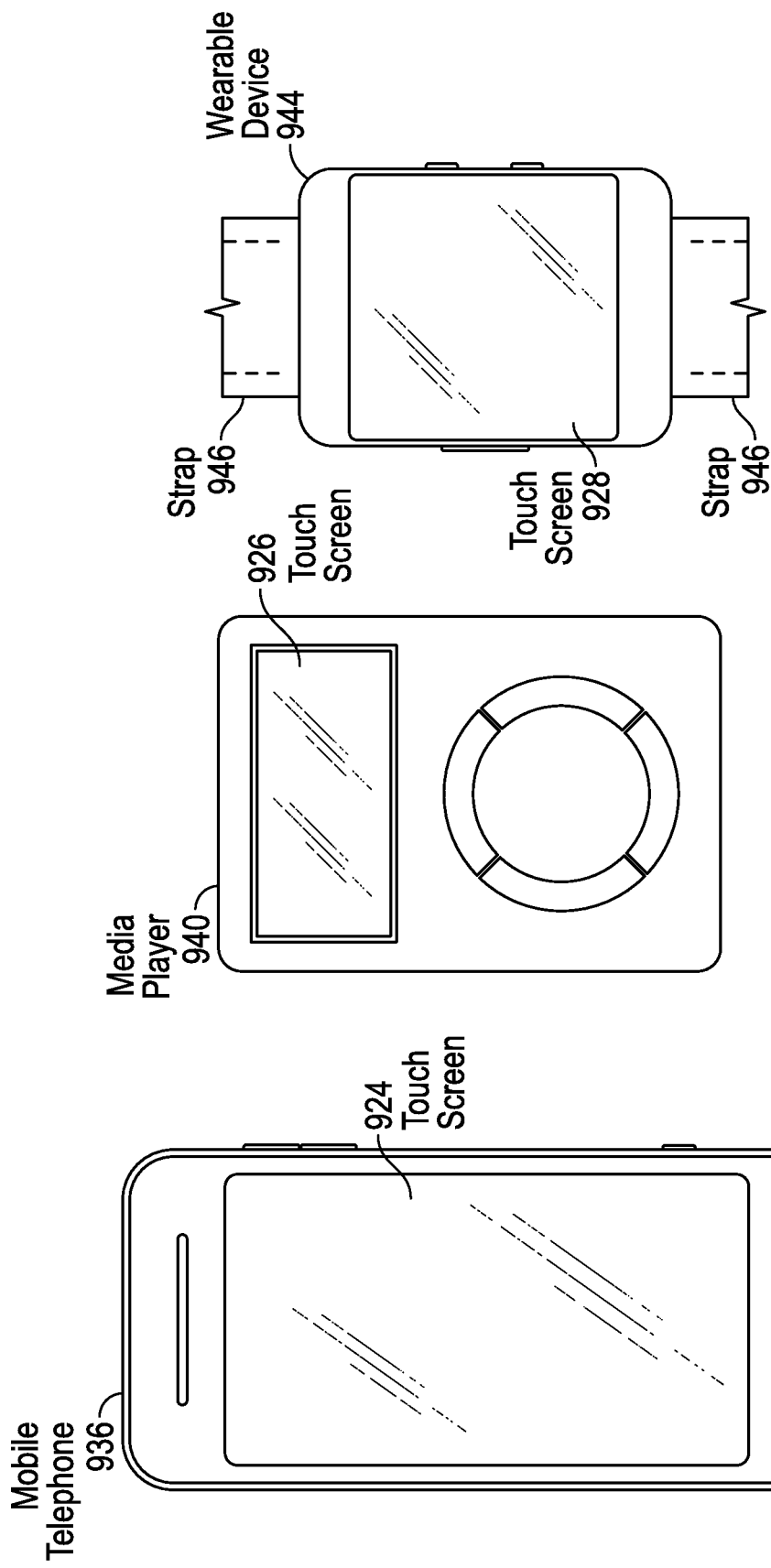

UNIFIED MESSAGE DELIVERY BETWEEN PORTABLE ELECTRONIC DEVICES

CROSS-REFERENCE TO RELATED APPLICATIONS

This application claims priority to U.S. Patent Application No. 62/005,715, filed May 30, 2014 and entitled "Unified Message Delivery Between Portable Electronic Devices," the disclosure of which is incorporated herein by reference in their entirety.

FIELD OF THE DISCLOSURE

This relates generally to wireless communication between portable electronic devices, and more particularly to message delivery between portable electronic devices.

BACKGROUND OF THE DISCLOSURE

It is increasingly common for a person to own multiple personal electronic devices, such as a smart phone, laptop computer, a tablet computing device, a portable multimedia player, and a wearable device. Many of the users that own multiple devices may not have one or more of the multiple devices with them at all times. However, some users may wish to send data, such as a message (e.g., a sent message), to another user from a first device and be able to receive messages from the other user on another or a second device. In such a situation, the user may desire to have the sent message stored in a messaging history in the second device. Additionally, some users may wish to receive messages or notifications on multiple devices.

Messages can be sent from a first device to a second device (or multiple devices) through the Internet and a push server. However, sending messages through the Internet can be slow as the messages may have to traverse through several entities (e.g., wireless access points, networks, push servers) leading to large latency times. Additionally, the transmission times can be further increased due to multiple devices and multiple users being connected to a push server. Each device and each user (or application) can generate and send multiple messages. The large number of messages can lead to a large load on the push server. To alleviate or overcome some of the issues with sending messages through the Internet and a push server, messages can be sent through a local communications link. However, the local communications link can have a limited range and feasibility.

SUMMARY

This relates to unified delivery of messages or notifications between multiple devices. Sending messages through a local communications link, such as but not limited to at least one of a Bluetooth connection and a peer-to-peer WiFi connection, can lead to faster transmission times and reduced server load. When the local communications link is unavailable or not suitable, the messages can be sent through a network and a push server. In some examples, messages can be sent through both the local communications link and through the network and the push server. Duplicates of a received message can be avoided by utilizing indicators. In some examples, one or more devices can include local queue(s) to ensure ordered delivery of a plurality of messages when one or both of the local communications link and Internet connection become unavailable.

BRIEF DESCRIPTION OF THE DRAWINGS

FIG. 4A illustrates an exemplary wireless device coupled to another wireless device through a local communications link and through a network and a push server according to examples of the disclosure.

FIGS. 9A-9C illustrate systems in which examples of the disclosure can be implemented.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Figure 1A:
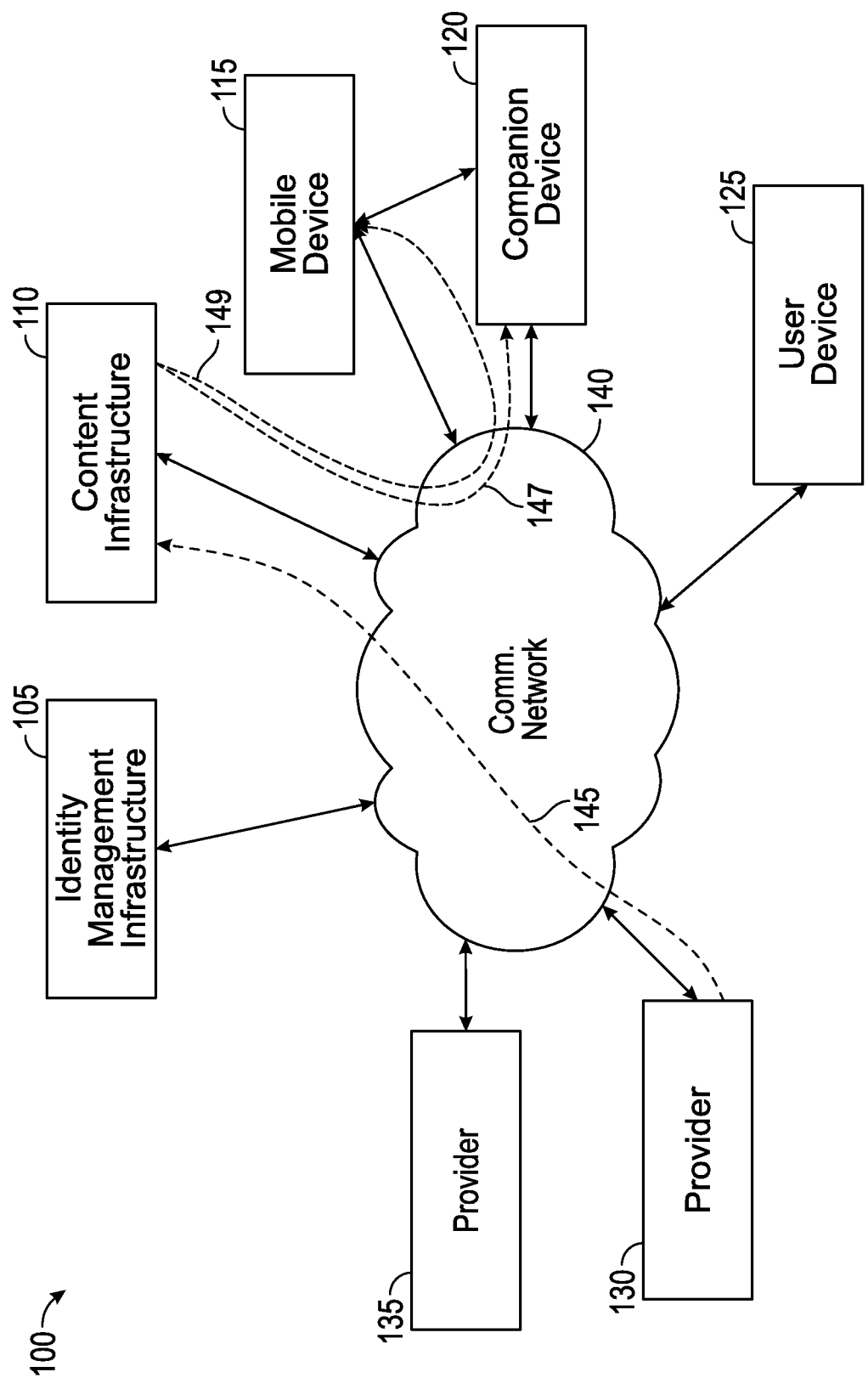
FIG. 1A is a block diagram of an exemplary system according to various examples of the disclosure.

FIG. 1A is a block diagram of an exemplary system according to examples of the disclosure. FIG. 1A and other figures are merely illustrative of an example or implementation, or other aspects of an example or implementation disclosed herein, and should not limit the scope of the disclosure as recited in the claims. One of ordinary skill in the art may recognize through this disclosure and the teachings presented herein other variations, modifications, and/or alternatives to the examples or implementations illustrated in the figures. FIG. 1A is an example of a system, which can use relay via host or mobile device to answer a call and enable the call to be performed with a client or companion device as an endpoint of the call. The devices in system 100 can include hardware and/or software elements.

In some examples, system 100 can include an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrared structure 105, content infrastructure 110, mobile device 115, companion device 120, user device 125, provider 130, and provider 135 can be each capable of communicating with and through communications network 140 (representing the Internet, wide area networks (WANs), metropolitan area networks (MANs), local area networks (LANs), wireless area networks (WiLANs), radio access networks (RANs), public switched telephone network (PTSN), etc., and/or combinations of the same). As illustrated, mobile device 115 can communicate directly with companion device 120 without utilizing communications network 140.

Identity management infrastructure 105 can be implemented in various examples using a single server computer system or can include multiple server computer systems, web servers, application servers, networks, interconnects, and the like. In various aspects, identity management infrastructure 105 can provide management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth security token services, or the like.

In some examples, identity management infrastructure 105 can maintain information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 can manage authorization information that defines what operations an entity can perform in the context of a specific application, service, or resource. Some authorizations can be based on a role, device type, application, application type, or the like associated with a managed entity. Users can be granted roles related to a particular job or job function. Identity management infrastructure 105 can also manage descriptive information about managed entities and how and by whom that information can be accessed and modified. As part of identity management, one or more host devices can be identified and associated with one or more client devices, such that incoming calls to the host devices can be relayed to the client devices, and such that the client devices can be used to initiate relayed calls using the host devices.

In some examples, identity management infrastructure 105 can create digital identifies for managed entities encompassing, for example, entity identifying information (PII) and ancillary information. In some examples, a managed entity can have multiple digital identities, and each digital identity can encompass multiple attributes. For example, a user can have a user identifier (e.g., a phone number, e-mail address, etc.) that is linked to multiple devices. In addition to creation, deletion, modification of digital identities, identity management infrastructure 105 can manage ancillary entity data for use by services, such as content infrastructure service 110.

In some examples, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In some examples, identity management infrastructure 105 can receive a single user identifier, which can be used to determine device identifiers for devices associated with the user identifier. During entity registration, in order to access services or resources managed by identity management infrastructure 105, one or more user or other identifiers and a unique entity or device identifier (UID) can be combined to generate an entity or device token. In some examples, the token can be encrypted by applying a hashing algorithm (e.g., SHA-0, SHA-1, SHA-2, MD5, Whirlpool, or other hashing algorithms). The tokens generated and encrypted for an entity can remain constant in some examples. When a token has been generated and encrypted by identity management infrastructure 105, the token can be sent back to the entity. The entity in some aspects can distribute the token to services or resources managed by identity management infrastructure 105 or other third party services for a variety of purposes relating to authentication, authorization, accounting, or the like of the entity at those managed services or resources of the trusted delivery of content to the entity by the third parties.

Content infrastructure 110 can be protected by and/or accessible to entities managed by identity management infrastructure 105. Content infrastructure 110 can be implemented in various examples using a single server computer system or can include multiple server computer systems, web servers, application servers, networks, interconnects, and the like.

Content infrastructure 110 can provide content to mobile device 115, companion device 120, and user device 125 as well as to other devices and entities. Examples of content can include a text message, a multimedia message, an impending calendar event, an audio/video call (e.g., using voice over internet protocol (VoIP)), or a notification of new data on a remote server. In some examples, the content can originate from one or more sources managed by identity management infrastructure 105 or provided directly by content infrastructure 110. In some examples, the content can originate from other sources. For example, content can originate from any one of mobile device 115, companion device 120, user device 125, and providers 130 and 135.

In some examples, content can be received from other sources such as the Internet, cellular networks, public switched telephone networks, and the like. Content infrastructure 110 can route the content to mobile device 115, companion device 120, user device 125, and providers 130 and 135. In some examples, content infrastructure 110 can route through the infrastructure a voice call received from or destined to a public switched telephone network.

In some examples, the content sent to mobile device 115 can be forwarded to companion device 120 for delivery to mobile device 115. Companion device 120 can also act and send signals on behalf of mobile device 115. In some examples, companion device 120 can act as a main or intermediary device and mobile device 115 can act as a proxied device. Content infrastructure 110 can coordinate how and whether companion device 120 can act and send signals on behalf of mobile device 115.

In some examples, content infrastructure 110 can send content to more than one device, when appropriate. A user may be associated with both mobile device 115 and companion device 120. Content infrastructure 110 can route the content to both mobile device 115 and companion device 120, such as to have a VoIP phone call ring on both devices or to have a message appear in the inbox of the same application installed on both devices. In some examples, content can be sent to only one device (e.g., to companion device 120), which can forward a call to mobile device 115. When a call is being forwarded to a device, a phone number can identify which device is to receive the phone/video call, and that device can relay a call as appropriate.

In some examples, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload can include new information received at a server application or a reference to where the information is to be found. The payload can further include a property list that specifies how the user is to be alerted about this new information by the particular service or client application.

An alert can come in a variety of forms. In some examples, content can be displayed to a user as an alert message or other visual representation, such as a badge associated with an application icon. Availability of the content can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (i.e., that the provider is who the provider alleges to be) and authorized to connect and utilizes content infrastructure 110 in a trusted manner.

While monitoring for incoming data intended for its client applications, when new data for an application arrives, the provider can prepare and send a notification through its channel connection to content infrastructure 110, which can push the notification to a push consumer or destination target device. Identity management infrastructure 105 can also ensure that the consumer or destination target device is authenticated and authorized to connect to and utilize services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 can be a provider of content to companion device 120, and vice versa as well as provider 130 providing content to provider 135, and vice versa.

In some examples, one or more one or more server computers can provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each of their connections can be authenticated and authorized by identity management infrastructure 105.

If a notification delivered by content infrastructure 110 for an application associated with a user's device arrives when the application is not running, the user's device can alert the user that the application has data waiting for it as discussed above. Content infrastructure 110 can also provide a default quality-of-service (QoS) component that provides store-and-forward capabilities. If content infrastructure 110 attempts to deliver a notification but a target device is offline, the notification can be stored for a limited period of time, and delivered to the device when it becomes available. In some examples, all recent notification for a particular application is stored. In some examples, only one recent notification for a particular application is stored. For example, if multiple notifications are sent while the device is offline, each new notification can cause the prior notification to be discarded. This behavior of keeping only the newest notification is referred to as coalescing notifications. In other examples, if the device remains offline for a long time, any notifications that were being stored for it can be discarded.

Provider 130 and provider 135 can be implemented in various examples using a single server computer system or can include multiple server computer systems, web servers, application servers, networks, interconnects, and the like. In various aspects, provider 130 and provider 135 can provide client applications that run on mobile device 115, companion device 120, and user device 125 and server applications that provide one or more services to which the client applications can connect. Provider 130 and provider 135 can seek to notify the client applications accessible to one or more of mobile device 115, companion device 120, and user device 125 that information is available to their respective users.

In some examples, a push provider can be a software developer, company, or organization that maintains server software configured to interact with one or more client applications on one or more of mobile device 115, companion device 120, and user device 125. Provider 130 and provider 135 can each connect with content infrastructure 110 through a persistent and secure channel while monitoring incoming data intended for their client applications. In some examples, provider 130 and provider 135 can connect over a binary interface that provides a high-speed, high-capacity interface (e.g., using a streaming TCP socket design in conjunction with binary content). The binary interface can be synchronous or asynchronous. For each interface, TLS (or SSL) can be used to establish a secured communications channel.

Mobile device 115, companion device 120, and user device 125 can be as a single device, a single computer system, multiple devices, or multiple computer systems. In some examples, mobile device 115, companion device 120, and user device 125, although labeled differently for convenience, can be embodied as a mobile device, a wearable device, or other mobile device (e.g., a laptop, palmtop, mobile phone, smart phone, multimedia phone, portable media player, GPS unit, mobile gaming systems, etc.). In addition to or in the alternative, companion device 120 and user device 125 can be embodied as described above as well as being embodied as personal computer systems, mainframes, server computer systems, cloud services, or the like. Mobile device 115, companion device 120, and user device 125 can include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In some examples, mobile device 115, companion device 120, and user device 125 can host one or more of a variety of client applications that communicate with one or more server applications provided by one or more providers (e.g., providers 130 and 135). These client applications can include applications specific to the intended function of a device (such as telephony applications or GPS applications) as well as e-mail clients, update/upgrade clients, news clients, web/blog clients, podcast clients, social networking clients, or other types of client applications where notification messages can be sent. These client applications can represent to a user one or more notification messages received using content infrastructure 110. Notifications can be represented to users in one or more manners defined by an operating system of the device, a graphical user interface toolkit, and/or the applications themselves. Some examples of representations of notifications include an e-mail indicator, a news item indicator, a podcast indicator, a change of on-line status of a social networking friend, and the like. In some examples, another service operating on a device can handle notifications for client applications.

As discussed above, mobile device 115, companion device 120, and user device 125 can receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In some examples, to ensure trust, a provider communicates the token when it connects with content infrastructure 110. Content infrastructure 110 can decrypt the device token and validate using identity management infrastructure 105 that the token was generated for the destination device. To validate in some examples, content infrastructure 110 can ensure that the device identifier contained in the token matches the device identifier in a device certificate used when the device registered with identity management infrastructure 105.

Referring to an operation of system 100 illustrated in FIG. 1A, in some examples, the operation can be to forward or otherwise communicate a notification message from provider 130 to companion device 120 as illustrated by path 145. In some examples, provider 130 can send an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilize the additional user-defined data to identify provider 130 in a trusted fashion. Other secure communications protocols (e.g., cryptographic protocols such as Transport Layer Security (TLS), etc.) can be used in other examples.

In some examples, where provider 130 can be associated with a particular application (e.g., Email, Facebook, or Twitter) and can include additional identifying (e.g., user-defined) data within the SSL certificate, Identity management infrastructure 105 can not only authenticate provider 130, but can also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some examples, the additional identifying data can identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service can be automatically provisioned for provider 130.

When provider 130 is trusted, content infrastructure 110 can receive the notification message from provider 130. As discussed above, the notification message can include a device token. Having received the notification message from provider 130, content infrastructure 110 can determine the destination for the notification message. In some examples, the destination can be determined based on the device token that is sent along with notification message. In some examples, it may not be necessary to send destination information as part of a token. By determining or extracting the destination from the device token or otherwise obtaining destination information for the content, content infrastructure 110 can then determine whether the destination is "online" or otherwise accessible.

If the destination is online, in some examples, content infrastructure 110 can route the notification message to the destination companion device 120 illustrated by path 147, for example, via a persistent connection maintained by companion device 120 with content infrastructure 110. If the destination is "offline" or otherwise inaccessible to content infrastructure 110, the content can be stored and delivery retried at a later time. Content infrastructure 110 can, in addition to or alternatively, route the notification message to mobile device 115 illustrated by path 149, for example, via a persistent connection maintained by companion device 120 with content infrastructure 110. Content infrastructure 110 can route content to a single device, multiple devices at the same time, or to one device for delivery to another device.

Figure 1B:
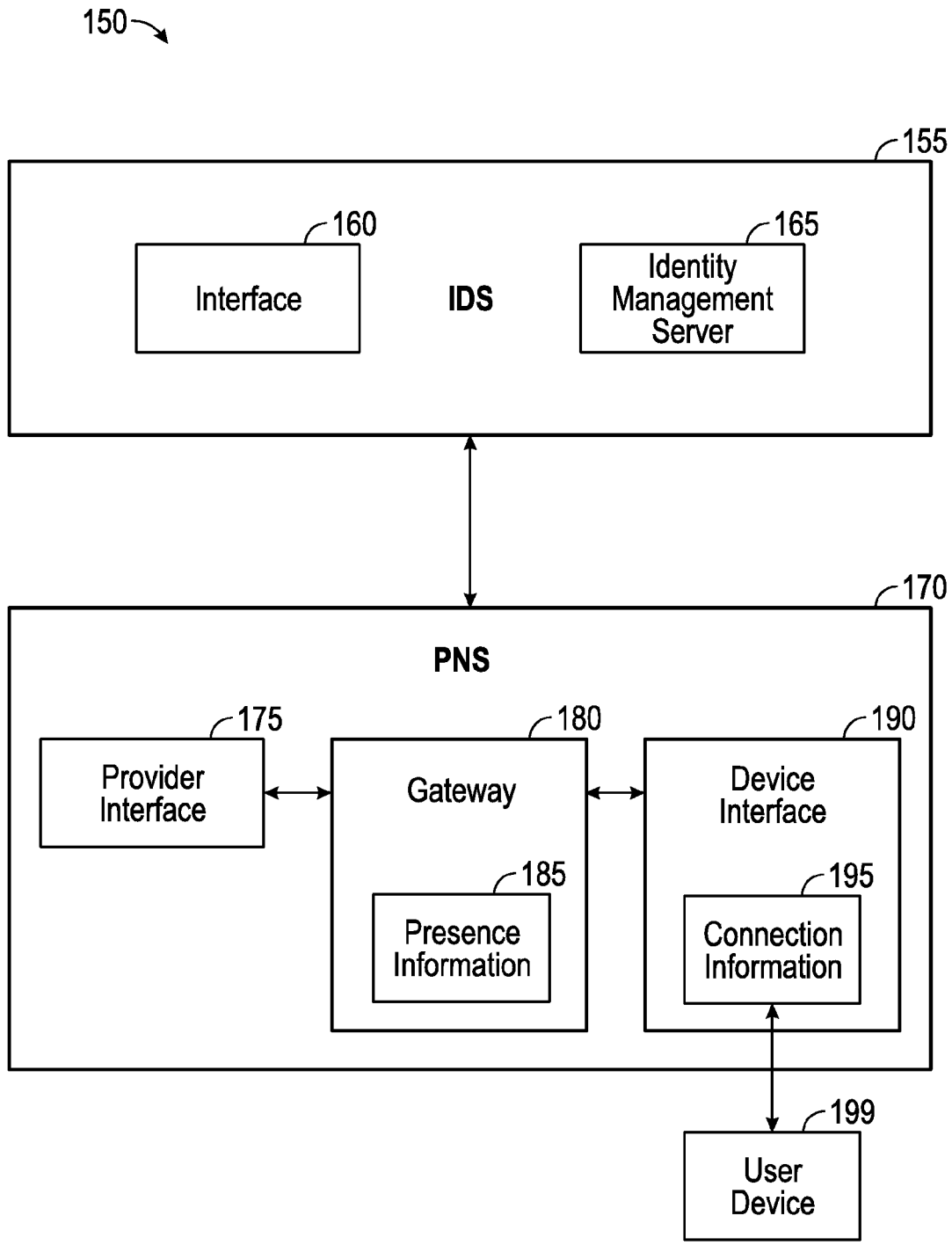
FIG. 1B illustrates a block diagram of an exemplary system configured to facilitate relay for answering and placing a call according to examples of the disclosure.

FIG. 1B illustrates a block diagram of an exemplary system configured, at least in part, to facilitate relay for answering and placing a call according to examples of the disclosure. Identity services (IDS) IDS 155 can be used to facilitate discovery and communication between a host device used as a relay and a client device used as a call endpoint. As recited herein mobile device 115 of FIG. 1A can be considered a host device, and companion device 120 can be considered a client device for the purposes of a relay system. System 150 can be used in a relay system and can be implemented in some examples using a single server computer system or can include multiple server computer systems, web servers, application servers, networks, interconnects, and the like. System 150 can be embodied as content infrastructure 110 of FIG. 1A in some examples.

In particular, FIG. 1B illustrates examples of forwarding content (e.g., notification messages and phone/video calls) between devices (e.g., between providers and mobile devices, or between a sending device of one user and receiving devices of another user). System 150 is shown with IDS 155 having interface 160 and identity management server 165 and push notification services (PNS) 170 having provider interface 175, gateway 180 having presence information 185, device interface 190 having connection information 195, and user device 199. Each service can be implemented using hardware and/or software elements.

In some examples, IDS 155 can be embodied as or from part of identity management infrastructure 105. IDS 155 can be implemented in some examples using a single server computer system or may include multiple server computer systems, web servers, application servers, networks, interconnects, and the like. Interface 160 can enable an entity (e.g., mobile device 115 or provider 130) to connect (e.g., via a network) in order to take advantage of service provided by IDS 155. Interface 160 can incorporate load balancing and other connection management techniques allowing entities to communicate with Identity management server 165.

In some examples, an entity can send information such as an authentication certificate that is received via interface 160 upon an initial connection to IDS 155 or to a service, resource, or application managed by IDS 155 (e.g., PNS 170). Identity management server 165 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 170, entities and their devices can be required to possess certain certificates, certificate authority (CA) certificates, or tokens.

In some examples, each provider of content can use a unique provider certificate and private cryptographic key for validating their connection with PNS 170. This certificate can be provisioned by identity management server 165 and identify the provider and/or a particular topic published by the provider. In general, the topic is a bundle ID of a client application. The provider can optionally wish to validate the service, to which the provider is connected, using a public server certificate provided by PNS 170. In some examples, the provider can use the public server certificate passed to it by identity management server 165 when registering to authenticate the service to which the provider has connected.

Identity management server 165 can also issue to each device, which desires to receive content, a unique private key and certificate that the device uses to authenticate itself to identity management server 165 and establish a connection to PNS 170. A device can obtain a device certificate and key from identity management server 165 during device activation and can store them in a keychain. The device can also hold its particular device token, which it can receive during the service connection process. Each client application that utilizes PNS 170 can be responsible for delivering this token to its content provider.

Identity management server 165 can store any necessary certificates, CA certificates, and cryptographic keys (private and public) for validating connections and the identities of providers and devices.

In some examples, when the entity is trusted, system 150 can allow the entity to utilize push notification services provided by PNS 170. PNS 170 can be implemented in some examples using a single server computer system or can include multiple server computer systems, web servers, application servers, networks, interconnects, and the like. The entity can be a provider or other notification provider desiring to connect with PNS 170 (e.g., via a network). In some examples, provider interface 175 can provide a high-speed, high-capacity interface allowing push notification providers to communicate with PNS 170. Provider interface 175 can incorporate load balancing and other connection management techniques allowing entities to communicate with PNS 170. Although provider interface 175 is shown as being linked to gateway 180, provider interface 175 can be incorporated into gateway 180 or device interface 190. As discussed above, a user device can be a provider of content in some examples as well as be a destination of content routed using PNS 170.

Gateway 180 can be implemented in some examples using a single server computer system or can include multiple server computer systems, web servers, application servers, networks, interconnects, and the like. Gateway 180 can determine the destination of content (e.g., push messages or call messages) received via provider interface 175 or device interface 190. In some examples, gateway 180 can determine a destination based on presence information 185. In some examples, presence information 185 can be maintained using a device's push token. Accordingly, when a push notification is received at gateway 180 directed to a particular push token, gateway 180 can perform a lookup to determine whether there is a TCP socket descriptor associated with that push token. The socket descriptor can provide the TCP socket information and other networking information needed to transmit the push notification. In some examples, presence information 185 can include mappings between authenticated entities and their connections to PNS 170. These connections can be utilized by PNS 170 for delivering content, notifications, and the like or otherwise communicating with an entity. Each mapping can be indicative of at least one entity and at least one connection mechanism to that entity, such as a network socket connection or other connection identifier. For example, a mapping can identify a destination device by its device token or a provider by its provider identifier. Additional information can be included in each mapping in order to facilitate communication with the entity's device.

In some examples, in order to scale handling of connections from an increasing number of users, devices, and providers utilizing services of PNS 170, device connections in presence information 185 (or the devices themselves) can be managed according to at least one grouping or logical partition called a zone. Functions performed by gateway 180 can be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers can also include routing information that is used to route content to other servers associated with a particular zone of the destination of the content. Thus, when content is received at one server, another server designed to handle a predetermined zone can be determined, and the content can be forwarded to the appropriate server. In some examples, functions performed by gateway 180 can be partitioned out to multiple servers to handle corresponding device connections (e.g., device interface 190).

In some examples, gateway 180 can be linked to device interface 190. Device interface 190 can provide an interface to communicate with user device 199. Device interface 180 can incorporate load balancing and other connection management techniques allowing devices to communicate with PNS 170. Although device interface 190 is shown as being linked to gateway 180, device interface 190 can be incorporated into gateway 180 or provider interface 175.

Device interface 190 can allow presence information 185 to be generated when device interface 190 is connected to user device 199. User device 199 can assert its presence to PNS 170 upon establishing a persistent connection. Device interface 190 can generate a device/connection mapping in connection information 195. Device interface 190 can back-propagate connection information 195 to gateway 180 allowing gateway 180 to generate a device/connection mapping in presence information 185. In some examples, presence information 185 can include a device/courier mapping or link allowing gateway 180 to determine an appropriate courier that acts as device interface 190 connected to user device 199. The courier can utilize connection information 195 (including any device/connection mappings or links) allowing the courier to determine connection information specific to user device 199 that can be used to deliver content to user device 199. In some examples, presence information 185 and connection information 195 can be substantially identical in that they include correspondences between a given device and its connection with PNS 170.

In some examples, a device wishing to receive content via PNS 170 can send authentication information either upon an initial connection with device interface 190 or directly to IDS 155. Identity management server 165 can receive the authentication information either directly or indirectly, and then authenticate and authorize the device or its associated user or organization as a registered and authorized entity. When the device is trusted, PNS 170 can be informed, and PNS 170 thereafter can manage any connections made between the device and PNS 170 (such as with device interface 190 in connection information 195). Device information available at device interface 190 in connection information 195 can be periodically back-propagated to gateway 170 to generate or update presence information 185.

When the device initially connects with PNS 170, PNS 170 can provision the device. In some examples, a zone is provisioned for the device as alluded to above. Despite a particular zone assignment for each device, devices can lose their connection with device interface 190 for various reasons. For example, a connection might be lost due to loss of cellular signal, or WiFi signal, loss of power, or because a mobile device has changed geographic locations, etc. In some examples, a connection can be intermitted as opposed to being persistent in order to conserve power or achieve other efficiency metrics.

When user device 199 attempts to reconnect to PNS 170, user device 199 can connect with any courier acting as device interface 190. In examples where device connections are assigned to at least one grouping or zone, device interface 190 can provision a connection with one or more servers of gateway 180 that are assigned to handle the zone of a connecting device. For example, if device interface 190 is connected to user device 199 that is assigned to zone 1, then device interface 190 can provision a connection with one or more servers responsible for managing zone 1. Device interface 190 can then back-propagate device information for user device 199 to the one or more servers responsible for managing zone 1. In similar fashion, device interface 190 can make connections with servers of different zones to back-propagate specific device information for devices associated with those respective zones ensuring that no matter where or how user device 199 connects to PNS 170, presence information 185 is up to date and available to determining how to route the content. In some examples, device interface 190 can be specific to a wireless carrier or internet service provider (ISP) allowing PNS 170 to support the protocols or physical connections specific to multiple third party entities.

According to some examples, when gateway 180 receives content from provider interface 175, gateway 180 can forward the content received from provider interface 175 to device interface 190 based on its mappings in presence information 185. Device interface 190 can deliver the content received from gateway 180 to user device 199 for which information about a persistent connection can be maintained in connection information 195.

Upon receiving content from gateway 170, device interface 190 can perform a lookup or otherwise consult its device connections in connection information 195 and send the content received from gateway 180 to the appropriate device, for example, over the persistent connection associated with user device 199. In some examples, device interface 190 can inspect the device token associated with the content to be delivered and can determine whether a match is found between the device token and the connections that device interface 190 manages in connection information 195. Device interface 190 can deliver the content using the connection established by the device having the given device token.

In some examples, user device 199 can subscribe to a particular application managed by a provider and can desire to receive notification messages for that application via PNS 170. Thus, user device 199 can call the provider either directly via a communications network or utilizing PNS 170 and can transmit its device token to the provider. The device token or its transmission can include not only a device's identification information but can include an encrypted combination of a device's UID and its zone identifier allowing PNS 170 to provision connection information for the device according to the appropriate resources allocated to the zone.

When the provider sends a notification message to the particular application on user device 199, the provider can connect to PNS 170 using provider interface 175 and can send the message to gateway 180. Even if user device 199 is associated with a particular zone, the provider may not need to connect to any particular gateway of PNS 170 to successfully push a notification message to user device 199. For example, if gateway 180 receives content from provider interface 175 and the content has a device token, gateway 180 can look at the token and either route the message to an appropriate server of PNS 170 (which may route the message to device interface 190 or another courier of PNS 180) or route the message directly to device interface 190.

If gateway 180 is the designated gateway, gateway 180 can send/forward the message to device interface 190 based on its device/courier mapping in presence information 195 in some examples. Device interface 190 can be able to lookup its connections in connection information 195 and can send the message to the device over the persistent connection established by the device with device interface 190. In summary, in cases where PNS 170 receives a message having a particular destination, a gateway of PNS 170 can forward that message directly to an appropriate courier of PNS 170 using a device/courier mapping that can be established when a device connects to PNS 170. In some examples, gateway 180 can send/forward the message directly to user device 199 based on its device/connection mapping in presence information 185. Gateway 180 can generate this mapping information from various sources to each of which a device has established a connection.

Figure 2A:
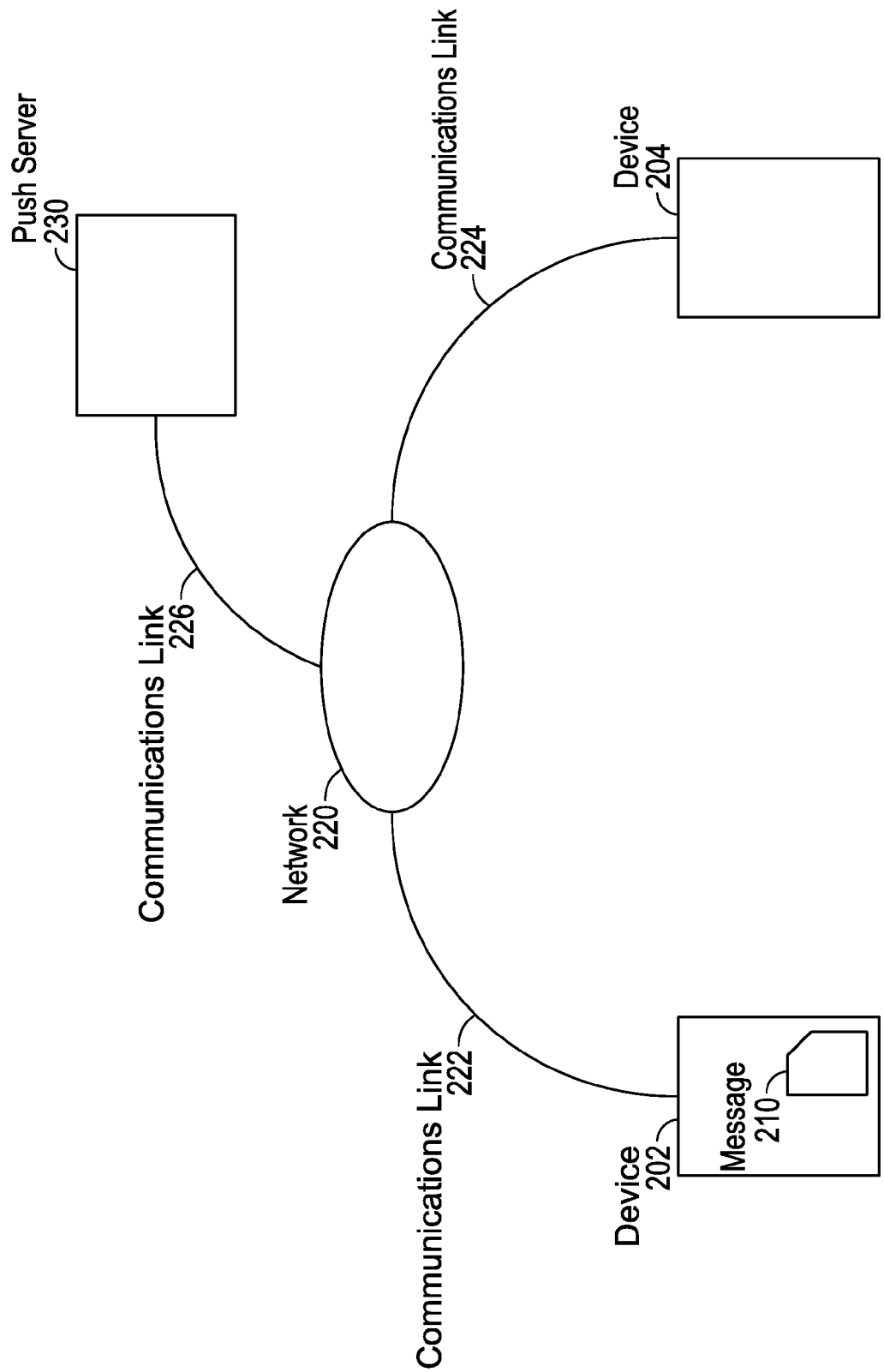
FIG. 2A illustrates an exemplary wireless device coupled to another wireless device through a network and a push server according to examples of the disclosure.

FIG. 2A illustrates an exemplary wireless device coupled to another wireless device through a network and a push notification service according to examples of the disclosure. Device 202 (such as mobile device 115 of FIG. 1A) may wish to transmit a message 210 or a copy of a message 210 to device 204 (such as companion device 120 of FIG. 1A). For example, a user may wish to send a text message to another user using device 202. Sometime later, the user may receive a response message from the other user. When the user receives the response message, device 202 may be inaccessible. Instead, the user can be alerted of the response message on the user's other device 204. Given the lapse of time, the user may have forgotten the contents of the original text message. In such a situation, it can be helpful for device 204 to have a copy of the original text message sent from device 202 in its messaging history.

To ensure that multiple devices owned or registered to a user or a user account receive the messages or notifications from one device, messages or notifications can be transmitted to one or more of the multiple devices. One way to have messages sent to multiple devices can be to use a push server. A push server can include the functionalities of the push provider 130 (or provider 135), identity management infrastructure 105, and content infrastructure 110 illustrated in FIG. 1A or can include the functionalities of the PNS 170 illustrated in FIG. 1B. Delivery of information can be initiated by the push server rather than by a device or a client. Multiple devices can be coupled to the push server.

Device 202 can act as a source device, and device 204 can act as a destination device. Device 202 can be coupled to a network 220 through communications link 222, and device 204 can be coupled to network 220 through communications link 224. Network 220 can be coupled to push server 230 through communications link 226. In some examples, network 220 can be coupled to a third-party storage server (not shown). In some examples, there is no third-party storage server. Instead, the functionality of the third-party storage server can be performed by push server 230. For simplicity, one source device, one destination device, and one push server are depicted in FIG. 2A. However, examples of the disclosure can include multiple push servers. Additionally, push server 230 can be configured to support multiple source devices, each of which may be associated with a different set of destination devices.

Push server 230 can be a mechanism used for a push message or push notification service that enables electronic devices (including push server 230 itself) to communicate pushed messages or notifications to one another. Push messages can include graphics, sounds, and/or text, and can be used to deliver various messages to electronic devices, e.g., news, stock quotes, weather forecasts, text messages, and/or notification of events such as email arrival, moves in a video game, etc. In some examples, push server 230 can enable an electronic device to communicate with a third-party server. For example, when a user receives a new email message from an email server (i.e. third-party server), the email server can send the message to push server 230, and push server 230 can push a notification to device 202 informing the end user of a new email message. Various other types of third-party servers or applications can utilize the push server to push notifications to the end user including phone service notifications, application store notifications, instant message notifications, and calendar notifications, just to name a few.

Push server 230 can use a network connection (e.g., an IP network connection) that is maintained using network 220 between source device 202 and push server 230 to receive push messages originating from source device 202. Push server 230 can also use another network connection that is maintained using network 220 between push server 230 and destination device 204 to send the pushed message from source device 202 to destination device 204. Messages can be pushed over a persistent or open Hypertext Transfer Protocol (HTTP) connection.

Network 220 can be any network or combination of networks that enables communication of data (data packets, control packets, etc.) between devices coupled to network 220, including the communication of push messages and acknowledgement messages for a push message service. Examples of a network such as network 220 can include, but are not limited to, a cellular network (e.g., EDGE, UMTS, HSPDA, LTE, etc.), a network based on standards described in IEEE 802.11 (e.g., an 802.11 wireless network), an optical network, a Local Area Network (LAN), a Wide Area Network (WAN), an Ethernet connection, the Internet, a wired telephone network and/or any combinations of those networks. Network 220 can transmit data using any protocol such as Transmission Control Protocol (TCP), User Datagram Protocol (UDP) and/or Internet Protocol (IP).

In some examples, destination device 204 can receive a push message from push server 230 and can perform a corresponding action (e.g., display information/a message to a user, start/notify an application, etc.) and/or can send a push message to push server 230 for delivery to another electronic device (e.g., send a text message to a user of another electronic device, send a calendar update to a calendar application on a remote server, etc.).

In order for the push server to route the push messages to the appropriate one or more devices, push server 230 can store device association data. Device association data can associate source device 202 with destination device 204 or can associate multiple devices with a given user or a given user account. Device association data can include the user's phone number, email address, device type, device address (or push token), and operating system version. In some examples, device association data can be stored locally in a memory location in push server 230. In some examples, device association data can be stored in another entity such as a database or in an address registry located outside of push server 230.

In some examples, device association data can be logically organized on a per-source device basis. For example, device association data can comprise a set of entries (e.g., in a table), where each entry associates a source device with one or more destination devices. Associations between multiple devices can be unilateral or multilateral. In a unilateral association, certain messages created at source device 202 can be automatically pushed to destination device 204, but the same type of message created at destination device 204 may not be automatically pushed to source device 202. In a multilateral association, messages created at one device can be pushed to other devices. In some examples, a single device can have a unilateral association with some devices, and multilateral associations with other devices.

In some examples, device association data can be established by push server 230 when push server 230 detects that source device 202 and destination device 204 are registered with the same user or same user account. Thus, after a user purchases a device, the user can register the device with push server 230 or another entity (e.g., a registry or identification server) that is associated with push server 230. Once it is determined that the same user has registered multiple devices (or that multiple devices are registered with the same account, which may be associated with multiple users), push server 230 can stored device association data that associates all the registered devices with each other.

In some examples, the push messages can include the device association data for the destination device. In some examples, source device 202 may not be required to specify, for each message transmitted to push server 230, which destination device(s) such as destination device 204 are to receive the message. Instead, push server 230 can be configured to determine which destination devices should receive the message (e.g., based on information previously provided from a user) and can ensure that the file is sent to the appropriate destination device(s).

Source device 202 can establish a connection (e.g., through communications links 222 and 226) to push server 230 through network 220 as follows. Source device 202 can establish a connection to a wireless access point, such as a wireless router. Wireless access point can be hardwired to the Internet or network 220 using a standard Ethernet cable, and can provide Internet connectivity to coupled devices. Wireless access point can periodically broadcast its presence and alert devices that it is available for connection. The broadcast can include a service set identifier (SSID) which can serve as a name or identity of the wireless access point. When source device 202 and/or destination device 204 wish to connect to network 220, the device can begin to "scan" for SSIDs being broadcast by wireless access points within range. When the device has completed its scan, a user can select the wireless access point from a list of available SSIDs. In some examples, the SSID can be stored on the device, and the device can automatically connect to the wireless access point when available. When the connection or communications link 222 is established, source device 202 can send to network 220 an Address Resolution Protocol (ARP) request including the (Internet Protocol) IP address of the intended destination (e.g., push server 230). The IP address of a device or server can be a unique set of numbers to identify the device or server. Push server 230 can be hardwired to network 220 through communications link 226. Devices or servers coupled to network 220 can compare their IP address to the one in the ARP request. Push server 230 can determine that its IP address matches the one in the ARP request, and can send an ARP response or acknowledgement message to source device 202. Destination device 204 can establish a connection (e.g., through communications link 224 and 226) to push server 230 through network 220 in a similar manner.

Figure 2B:
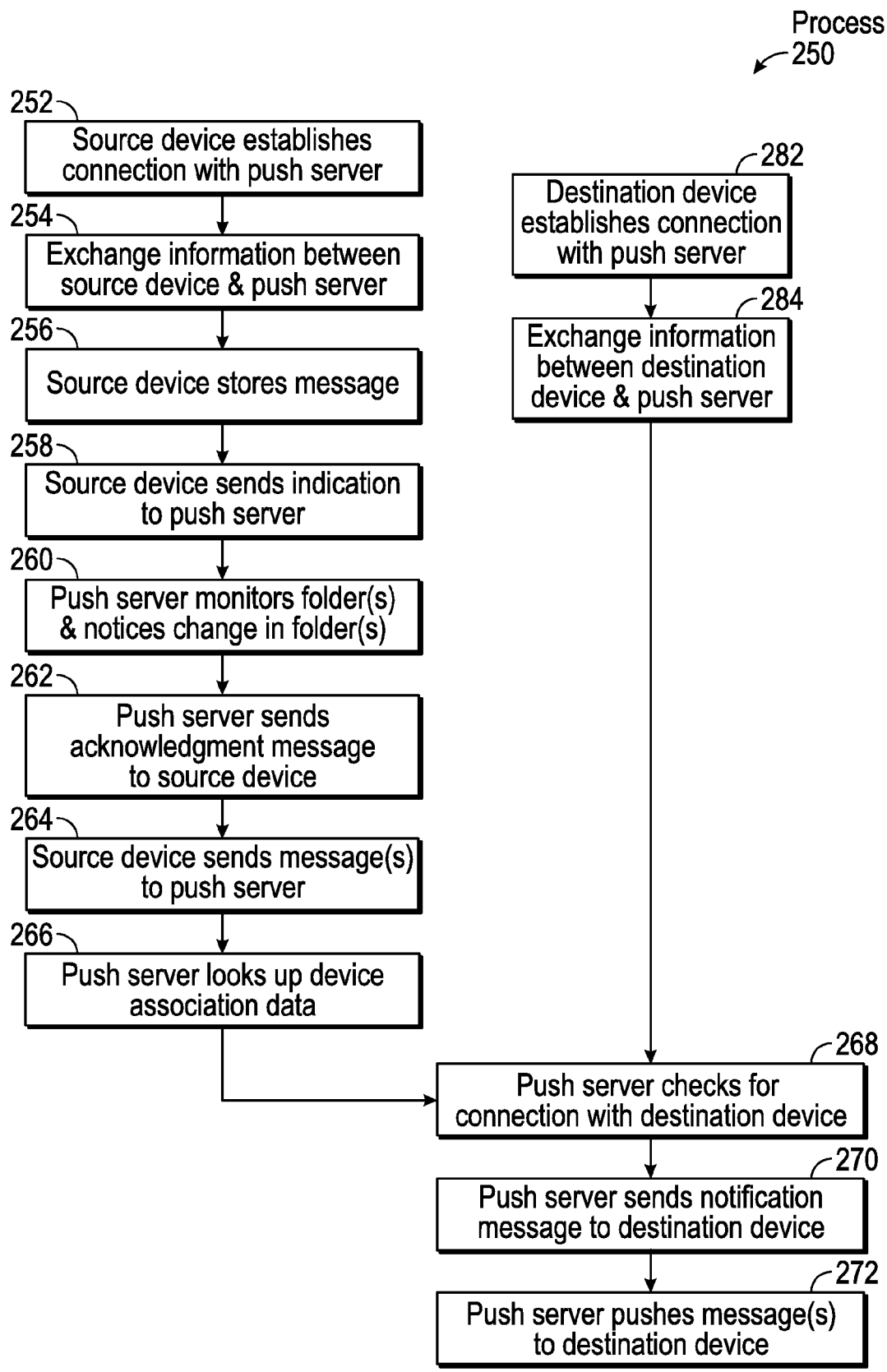
FIG. 2B illustrates an exemplary process for pushing a message from a source device to a destination device through a network using a push server according to examples of the disclosure.

FIG. 2B illustrates an exemplary process for pushing a message from a source device to a destination device through a network using a push server according to examples of the disclosure. Process 250 can include source device 202 establishing a connection with push server 230 through network 220 and communications links 222 and 226 in step 252. At step 254, certain information can be exchanged between source device 202 and push server 230. Information can include folders and a "heartbeat" interval. The folders can be used by push server 230 to monitor for changes or new messages to push. The heartbeat interval can be used by the push server to keep the persistent or open connection from timing out. Source device 202 can periodically send updates to the push server 230, alerting the push server 230 that device 202 is available to receive messages. The heartbeat interval can indicate the time between these periodic updates. Before, after, or concurrently, destination device 204 can establish a connection with push server 230 through network 220 and communications link 224 and 226 in step 282. In step 284, folders and heartbeat interval can be exchanged between destination device 204 and push server 230.

At step 256, source device 202 can store message 210. Source device 202 may have created message 210. Alternatively, source device 202 may have received message 210 from another device, such as a camera, application or another computing device, such as a smart phone, laptop or tablet. At step 258, source device 202 can send an indication that source device 202 has one or more messages to be pushed to one or more other devices through network 220 to push server 230. The indication can be stored in the folders located on the push server 230. The indication can be sent in response to detecting a message-triggering event, but in some examples, may not occur immediately after the message-triggering event. For example, if source device 202 is offline when message-triggering event occurs, then step 258 can occur the next time that source device 202 connects to network 220. In some examples, the indication that is sent by source device 202 can include message 210.

The indication sent from source device 202 to push server 230 can include identification data that identifies message 210. Alternatively or additionally, push server 230 can create the identification data for message 210. The identification data for message 210 can be based on one or more criteria, such as the message name, an identity (e.g., name) of source device 202, date and time that message 210 was created and/or date and time the indication was received at push server 230. The identification data for message 210 can be unique relative to all files transmitted from source device 202 or relative to all messages about which push server 230 can be notified from all source devices.

In some examples, the creation (or storage) of message 210 at source device 202 can trigger the performance of step 258. For example, a user can take a digital image using a smart phone that includes a camera. Software executing on the smart phone can detect that the digital image was created and can cause step 258 to be performed. Another possible trigger for the performance of step 258 can be the establishment of a connection between source device 202 and push server 230. For example, source device 202 can be a WiFi enabled smart phone that is out of range of a WiFi signal when a picture is taken with the smart phone. When the smart phone is in range and the connection is strong enough to send message 210 using WiFi capability, a process executing on the smart phone can initiate step 258. As a similar example, the smart phone can wait until the smart phone is in range of a signal such as from a cell phone network before performing step 258.

At step 260, push server 230 can monitor the folders and can notice a change in the monitored folders. At step 262, push server 230 can send an acknowledgement message to source device 202. Acknowledgement message can indicate to source device 202 that push server 230 is available to receive one or more messages. At step 264, source device 202 can receive the acknowledgement message and can send message 210 to push server 230 in response to the acknowledgement message. Message 210 can include information regarding which device (e.g., destination device 204) the push server 230 should push message 210 to. In some examples, push server 230 can store message 210 in its own local memory. In some examples, a third-party storage server can be used to store message 210. In such situations, the push server 230 can generate and send storage location data corresponding to the third-party storage server to device 202.

In step 266, push server 230 can look up the device association data to determine which device to push message 210 to. If source device 202 is associated with multiple sets of destination devices, then push server 230 can analyze selection criteria associated with source device 202 to determine the appropriate set of one or more destination devices indicated in the device association data. In some examples, device association data can be stored in another entity (e.g., database or registry), and push server 230 can retrieve device association data from this another entity.

At step 268, push server 230 can check for a connection between push server 230 and destination device 204. If a connection, such as communications link 224, exists, push server 230 can send a notification message to destination device 204 in step 270. Notification message can indicate to destination device 204 that one or more messages are pending on the push server 230. In some examples, the notification message can wake up destination device or a corresponding application from a sleep or standby state. At step 272, destination device 204 can receive notification message indicating that one or more push messages exist on push server 230, and push server 230 can push the one or more messages including message 210 to destination device 204.

Although source device 202 can send messages to destination device 204 through push server 230 and network 220, sending messages through network 220 can be slow and connectivity can be limited. Additionally, push server 230 can be coupled to multiple networks and a plurality of devices. The plurality of devices can be sending messages at a same time, and therefore, can lead to a large number of messages and a higher load on the push server. Additionally, sending messages through the push server can lead to large amount of power consumption. As devices such as devices 202 and 204 become increasingly small, power conservation can be essential.

Figure 3A:
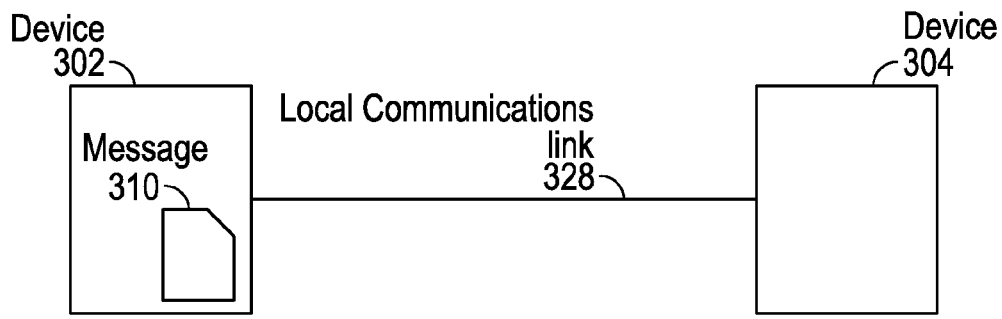
FIG. 3A illustrates an exemplary wireless device coupled to another wireless device through a local communications link according to examples of the disclosure.

FIG. 3A illustrates an exemplary wireless device coupled to another wireless device through a local communications link according to examples of the disclosure. Device 302 can send messages such as message 310 to device 304 via a local communications link 328. Devices 302 and 304 can be any portable or non-portable electronic device that has the ability to connect to a computer network wirelessly. As long as devices 302 and 304 are properly paired together, local communications link 328 can be established between the two. Pairing can refer to device 302 and device 304 establishing a direct, local communications link with one another. When local communications link 328 has been established between the device 302 and device 304, thus making the devices paired together, devices 302 and 304 can share information with each other.

Local communications link 328 can be a local wireless network, often referred to as a peer-to-peer link. A peer-to-peer link can be a local communications link where one or more devices are coupled and share messages or data without the need of a separate server or host device (e.g., network 220 of FIG. 2A). Local communications link 328 can be established using any number of peer-to-peer communications such as Bluetooth Classic (e.g., IEEE 802.15 protocols), Bluetooth Low Energy (LE), ZigBee, Apple Wireless Direct Link (AWDL), WiFi Direct, 802.11z Tunneled Direct Link Setup (TDLS) and/or any combination of those protocols.

Bluetooth Classic is a short-range wireless communications technology that uses short wavelength radio waves operating in the range of 2.4-2.485 GHz. To avoid interference with other communications, frequency-hopping is employed where transmitted data is divided into packets, and each packet is transmitted on a Bluetooth Classic channel. A physical radio channel can be shared amongst the group of devices in the piconet. The master device can generate a common clock signal and frequency-hopping pattern that the one or more slave devices can synchronize to.

Bluetooth LE can be a wireless technology that consumes a fraction of the power that Bluetooth Classic does. The lower power consumption can be attributed to a different data protocol than Bluetooth Classic. The data protocol for Bluetooth LE can have low duty-cycle transmissions or very short transmission bursts between long periods. As a result, Bluetooth LE can spend a large amount of time in a low-power sleep mode. Additionally, it can utilize adaptive frequency hopping similar to Bluetooth Classic, but at a slower rate.

Peer-to-peer WiFi can be a communications technology with faster transfer rates and a longer range than Bluetooth Classic and Bluetooth LE. Example peer-to-peer WiFi communications can include, but are not limited to, Apple Wireless Direct Link (AWDL), WiFi Direct, and IEEE 802.11z Tunneled Direct Link Setup (TDLS). Peer-to-peer communications links can be established with or without the need for a physical access point or internet connection. Some peer-to-peer WiFi communications can operate using an embedded software access point. The software access point can be located in a device. As a result, the software access point can allow a device to use WiFi and can also act as an access point that the WiFi originates from.

Bluetooth Classic, Bluetooth LE and peer-to-peer WiFi are used only as examples and the disclosure is not limited in this regard, and can also include other known communication methods such as near field communication protocols (NFC).

Figure 3B:
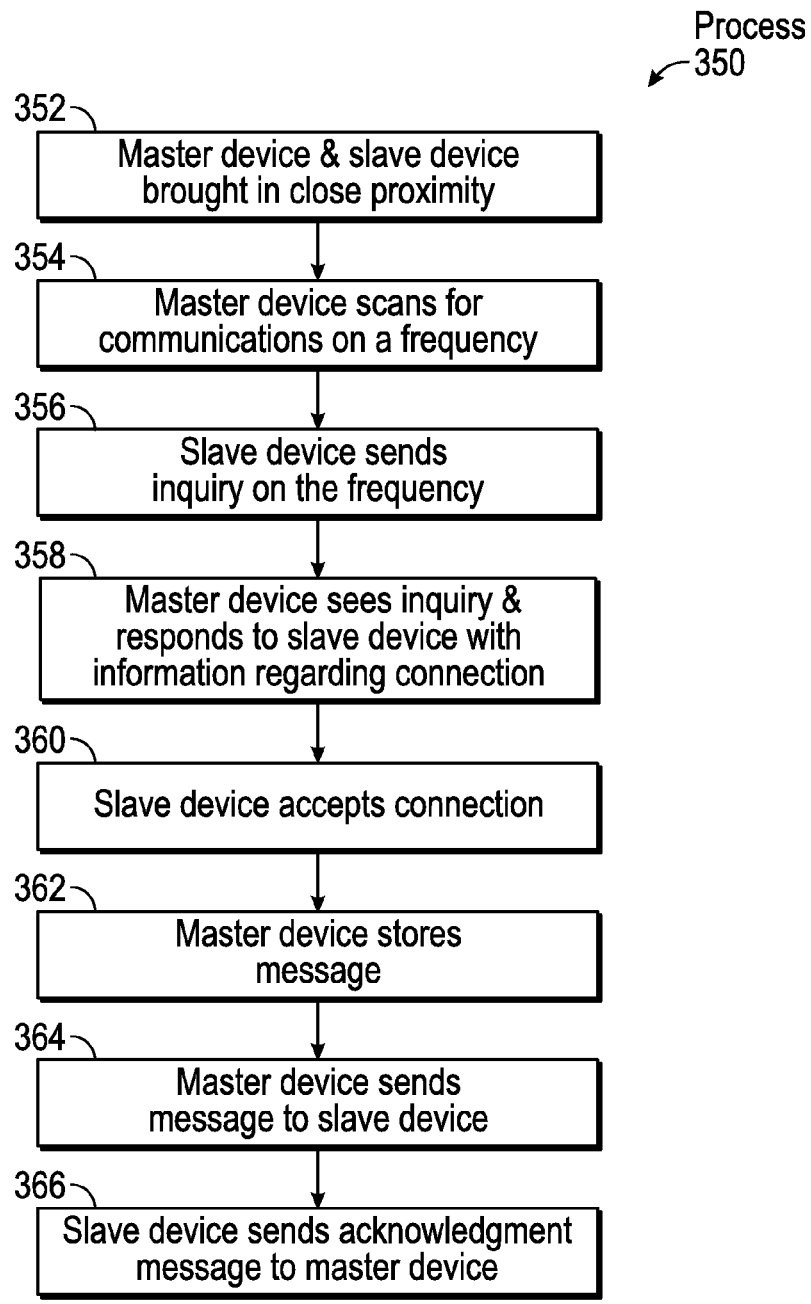
FIG. 3B illustrates an exemplary process for sending a message from a wireless device to another wireless device through a local communications link according to examples of the disclosure.

FIG. 3B illustrates an exemplary process for sending a message from a wireless device to another wireless device through a local communications link according to examples of the disclosure. Process 350 can include establishing a local communications link 328. Device 302 can serve as a master device, and device 304 can serve as a slave device. Master device 302 may wish to send a message 310 to slave device 304.

To facilitate the pairing of master device 302 with slave device 304, in step 352, master device 302 and slave device 304 can be brought in close proximity to one another, which can include direct physical contact. The close proximity of the devices can secure the pairing process from unauthorized intruders and allow for communication between the devices through local communications link 328. In step 354, master device 302 can scan for communications on a known frequency. In step 356, slave device 304 can send an inquiry on that known frequency. In step 358, when master device 302 "sees" the inquiry from slave device 304, master device 302 can send a response to slave device 304 with information regarding a connection to establish local communications link 328. Slave device 304 can receive the information and can respond by accepting the connection, thereby establishing local communications link 328. The pairing process may or may not require a pin code.

In step 362, master device 302 can create and/or store message 310. In some examples, master device 302 may have received message 310 from another device, application or server. In step 364, master device 302 can send message 310 to slave device 304 through local communications link 328. Once slave device 304 receives message 310, slave device 304 can send an acknowledgement message to master device 302.

In some examples, both devices 302 and 304 can include a local communications unit (not shown). Devices 302 and 304 can periodically monitor the connection through local communications link 328 using the local communication units. If a connection through local communications link 328 is not detected or has been dropped, at least one of the local communication units can attempt to reestablish a connection. If the initial attempt to pair device 302 and 304 fails or the dropped connection cannot be reestablished, device 302, device 304, or both can generate an event notifying the other device or the user. In some examples, multiple devices can be coupled to the master, forming a piconet.

While sending messages through a local communications link can lead to faster transmission times, lower power consumption, and reduced load on the push server, there can be scenarios where a connection between device 302 and device 304 may be not be possible or suitable using local communications link 328. For example, the physical separation between device 302 and 304 can be outside the range of one or more of the peer-to-peer communications technologies. Furthermore, the number of devices that can be coupled through local communications can be limited or a more secure connection can be desired. When the physical separation between wireless devices are outside the range of local communications, the number of coupled devices has been exceeded, and/or a faster transmission time is required, local communications link 328 can be lost or dropped, and messages can no longer be shared between device 302 and 304 of FIG. 3A. In such situations, an alternative connection can be used.

FIG. 4A illustrates an exemplary wireless device coupled to another wireless device through a local communications link and through a network and a push server according to examples of the disclosure. Device 402 can be coupled to device 404 through a peer-to-peer link or local communications link 428. Local communications link 428 can be established according to examples disclosed above. Device 402 can also be coupled to device 404 through network 420 and push server 430. Device 402 can be coupled to network 420 through communications link 422, device 404 can be coupled to network 420 through communications link 424, and push server 430 can be coupled to network 420 through communications link 426. Device 402 can include a transceiver for establishing local communications link 428 and another transceiver for establishing the communications link 422. In some examples, push server 430 can be coupled to a third-party storage server, a database, and/or a registry (not shown). The third-party storage server can be a temporary storage location for messages that are being transmitted through network 420 and push server 430. Alternatively, push server 430 can store messages in its own local memory. The database or registry can be used to store device association data. While FIG. 4A illustrates two wireless devices, any number of wireless and/or wired devices can be configured and authorized to send and receive messages. In some examples, more than one push server can be included to support a push service and storage of the messages or data.

Device 402 can send one or more messages such as message 410 to device 404 through local communications link 428 when the conditions are suitable for peer-to-peer communications such as, for example, when device 402 and device 404 are physically separated a distance no greater than the maximum distance of the peer-to-peer communications technology. Suitable conditions can include, but are not limited to, messages transferred at speeds under, for example, 25 Mbps for Bluetooth Classic or Bluetooth LE or 250 Mbps for peer-to-peer WiFi. In some examples, devices 402 and 404 can be paired together, and local communications link 428 can be established using the master-slave structure as described above.

If the conditions become unsuitable for a peer-to-peer link or local communications link 428 is broken, message 410 can be sent through network 420 and push server 430 (through communications links 422, 424, and 426). Communications links 422, 424, and 426 can be established using the process described above. Device 402 can send message 410 to network 420. Network 420 can forward message 410 to push server 430. Push server 430 can check if a connection to device 404 (e.g., communications link 424) exists. If a connection to device 404 exists, push server 430 can push message 410 to device 404.

Figure 4B:
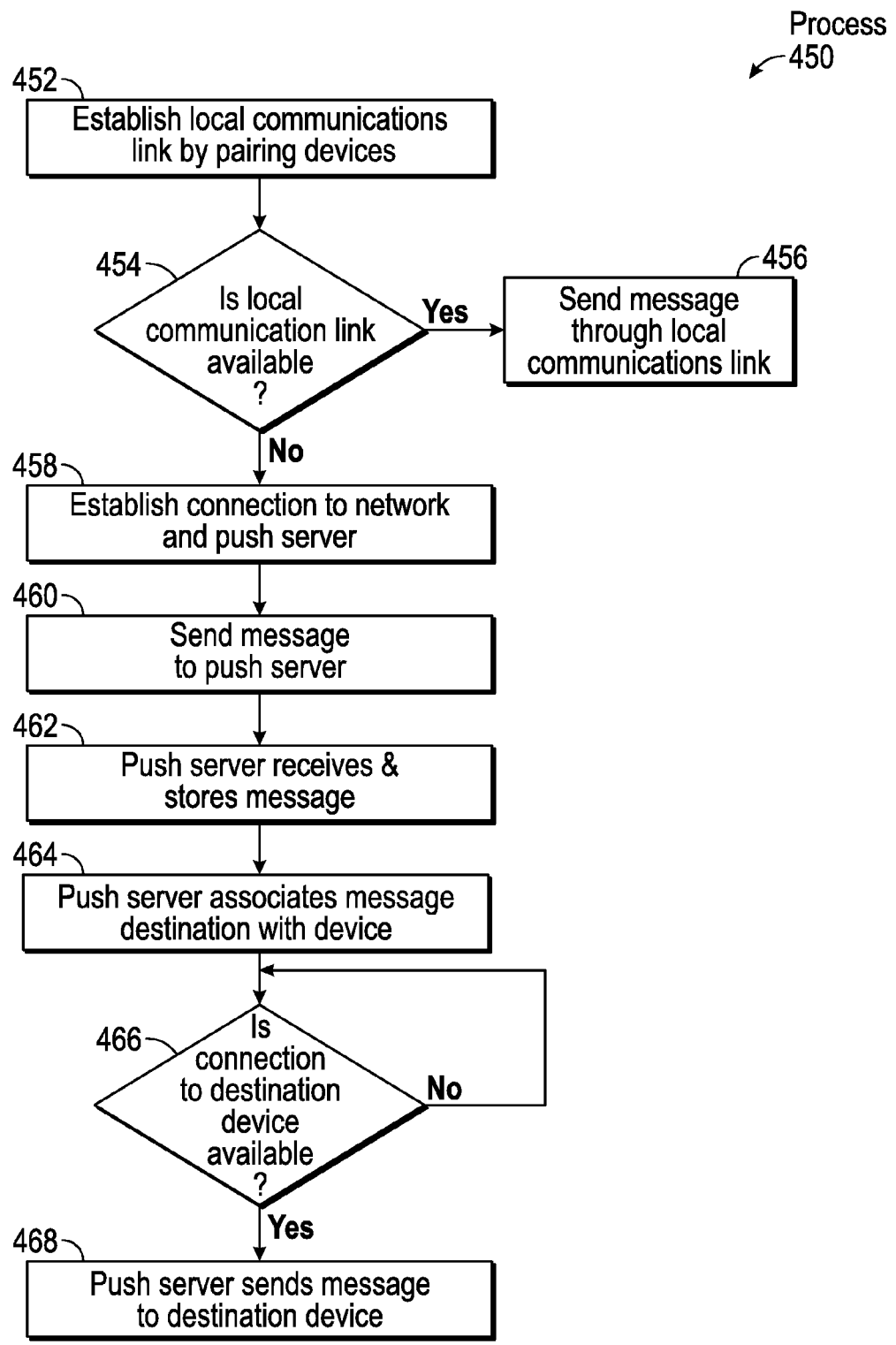
FIG. 4B illustrates an exemplary process for sending a message from a wireless device to another wireless device coupled through a local communications link and through a network and a push server according to examples of the disclosure.

FIG. 4B illustrates an exemplary process for sending a message from a wireless device to another wireless device coupled through a local communications link and through a network and a push server according to examples of the disclosure. Device 402 may wish to send a message 410 to device 404. Process 450 can include establishing local communications link 428 by pairing devices 402 and 404 in step 452. Once local communications link 428 has been established, device 402 has the capability of sending messages to device 404 through local communications link 428. However, local communications link 428 can become unavailable (i.e., device 404 is "offline") at any point in time. In some examples, local communications link 428 can be broken before message 410 has been sent from device 402 to device 404. In step 454, device 402 can check if local communications link 428 is available. If local communications link 428 is available, message 410 can be sent through local communications link 428 in step 456.

If local communications link 428 is unavailable, device 402 can establish a connection to network 420 through communications link 422 in step 458. Additionally, device 404 can establish a connection to network 420 through communications link 424. Establishing communications links 422 and 424 can include connecting to a wireless access point using examples previously described. In some examples, step 456 can be performed before step 452. In some examples, steps 456 can be performed at the same time as step 452. In some examples, communications links 422 and 424 can be established at different times. In some examples, device 402 can be coupled to device 404 through local communications link 428 and can also be coupled to network 420 through communications link 422 at the same time. Similarly, device 404 can be coupled to device 402 through local communications link 428 and can also be coupled to network 420 through communications link 424 at the same time. In some examples, step 456 can include source device 402 sending indications, folders, and a heartbeat interval to push server 430 through network 420.

In step 460, source device 402 can send message 410 to push server 430. In step 462, push server 430 can receive and store message 410 in its own local memory. In some examples, step 462 can include source device 402 and/or push server 430 storing message 410 on a third-party storage server. In step 464, push server 430 can associate message 410 with device 404 using device association data. In some examples, step 464 can include push server 430 accessing an external registry or database to identify the association.

When push server 430 associates message 410 with device 404, push server 430 can check if a connection (e.g., communications link 424) to device 404 is available in step 466. If communications link 424 is unavailable, push server 430 can keep message 410 located in its local memory (or on a third-party server). Push server 430 can periodically check for the connection or can wait for an indication when communications link 424 becomes available. If and when communications link 424 becomes available, push server 430 can send message 410 to destination device 404 through network 420 in step 468.

In some examples, device 402 can automatically default to sending message 410 through local communications link 428. In some examples, establishing local communications link 428 can be attempted multiple times. Device 402 can switch to sending message 410 through the push server 430 and network 420 after a predetermined number of attempts or after a predetermined time period has elapsed. In some examples, device 402 can send message 410 through local communications link 428, and can send message 410 through push server 430 and network 420 if device 402 has not received an acknowledgement message from device 404 after a predetermined amount of time has elapsed. In some examples, device 402 can include intelligent filtering or preferences for scenarios where a default method of sending message 410 can be through the local communications link 428 or the default method can be through push server 430 and network 420. In some examples, steps 458 to steps 468 can occur before steps 452 and 454. In some examples (e.g., when fast delivery, the low latency, and/or ensured message delivery is desired), message 410 can be sent through both local communications link 428 and through push server 430 and network 420.

With the option of sending message 410 through either or both local communications link 428 and the Internet (e.g., through push server 430 and network 420), at least one of the power consumption, server load, transmission time and number of lost messages can be reduced. In some examples, the preferred or default mode of delivery can be based on the different types of devices 402 and 404. For example, device 402 can be a media player and device 404 can be a tablet computing device. The user may have a preference for keeping device 402 separated a large physical distance from device 404. Device 402 (e.g., media player) can be typically kept in the user's car, while device 404 (e.g., tablet computing device) can be typically kept in the user's house. In such a situation, a local communications link 428 between device 402 and device 404 can rarely be available. To conserve power and for faster transmission times, the preferred method of communication between device 402 and 404 can be through the push server 430 and network 420.

Figure 5A:
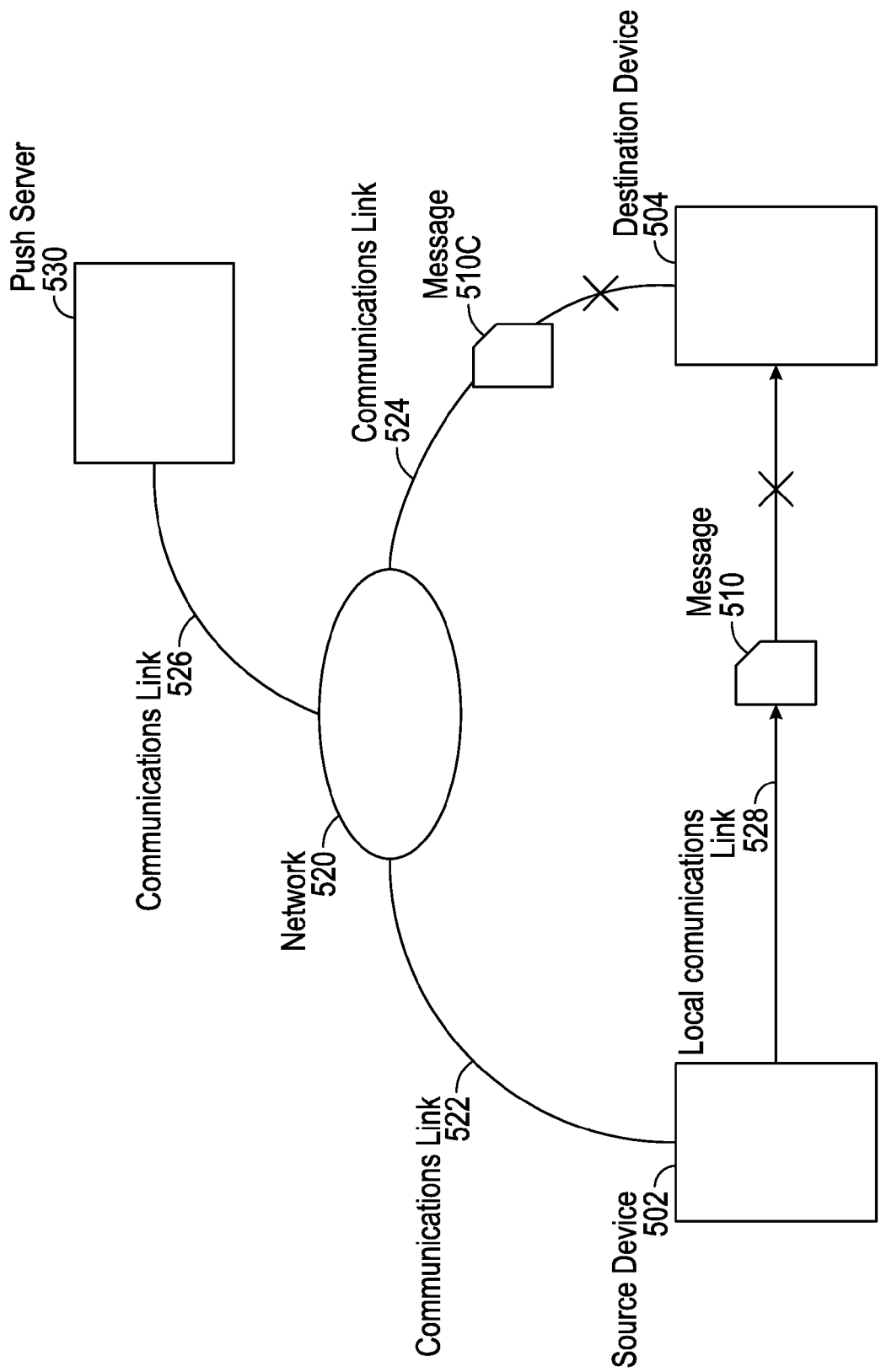
FIG. 5A illustrates an exemplary wireless device coupled to another wireless device through a local communications link and through a network and a push server according to examples of the disclosure.
Figure 5B:
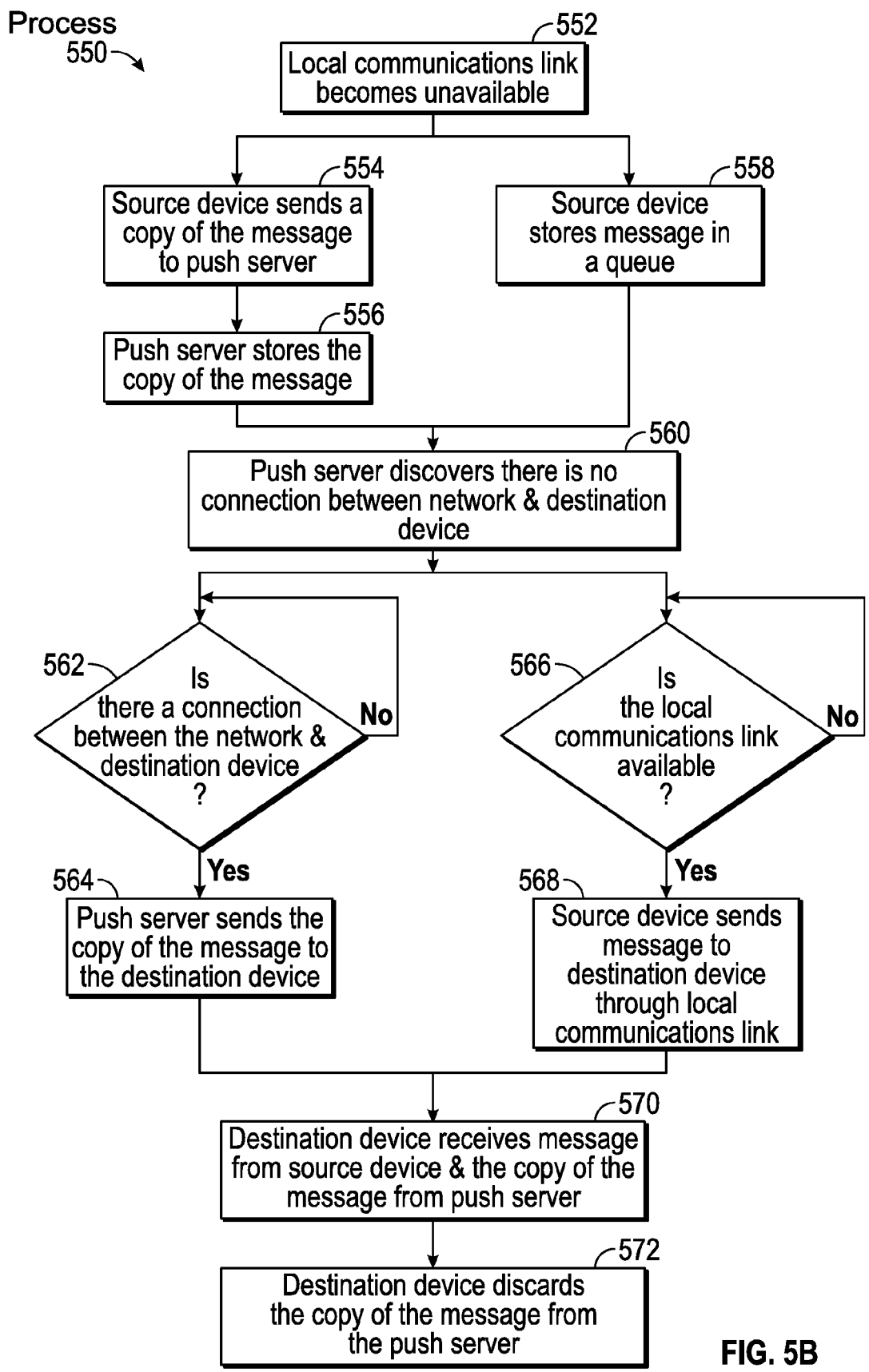
FIG. 5B illustrates an exemplary process for sending a message from a wireless device coupled to another wireless device through a local communications link and through a network and a push server according to examples of the disclosure.

FIG. 5A illustrates an exemplary wireless device coupled to another wireless device through a local communications link and through a network and a push server, and FIG. 5B illustrates a corresponding exemplary process according to examples of the disclosure. Source device 502 can be coupled to destination device 504 through local communications link 528 and can be coupled through push server 530 and network 520 (through communications link 522, 524, and 526). Source device 502 may wish to send message 510 to destination device 504. However, local communications link 528 and communications link 524 can become unavailable. As a result, destination device 504 may not receive message 510.

Since local communications link 524 is unavailable, source device 502 can attempt to send message 510 through the Internet (e.g., through push server 530 and network 520) in process 550. After source device 502 detects that local communications link 528 is unavailable in step 552, source device 502 can send a copy of message 510 (referred to as "message 510C") to push server 530 through network 520 in step 554.

Message 510C can be stored on push server 530 (e.g. step 462 of FIG. 4B) in step 556, and message 510 can also be stored in a local queue of source device 502 (e.g., step 362 of FIG. 3B) in step 558. Push server 530 can attempt to send message 510C through communications link 524, and can discover that a connection between network 520 and destination device 504 (e.g., communications link 524) is unavailable in step 560. In some examples, push server 530 can notify source device 502 that message 510C was not sent to destination device 504.

Push server 530 can periodically check for communications link 524 to become available in step 562. Additionally, source device 502 can periodically check for local communications link 528 to become available in step 566. In some examples, local communications link 528 can become available before or at the same time that communications link 524 becomes available. In such a situation, in order to ensure timely delivery of message 510 (or message 510C) and/or if the preferred mode of delivery is through local communications link 528, source device 502 can re-send message 510 to device 504 (step 568) through local communications link 528. However, push server 530 may be unaware that device 504 received message 510. As a result, when communications link 524 becomes available, push server 530 can send message 510C to destination device 504 in step 564. As a result, device 504 can receive messages 510 and duplicate message 510C in step 570. To overcome the issue of destination device 504 receiving duplicate messages, source device 502 can include an indication in message 510 that a duplicate message 510C was sent to the push server 530. When destination device 504 receives the indication, destination device 504 can ignore and/or discard message 510C in step 572. In some examples, message 510C can alternatively or additionally include the indication. In some examples, message 510 and message 510C may not include the indication, and destination device 504 can perform a check to determine if message 510 and message 510C are duplicates.

Figure 6A:
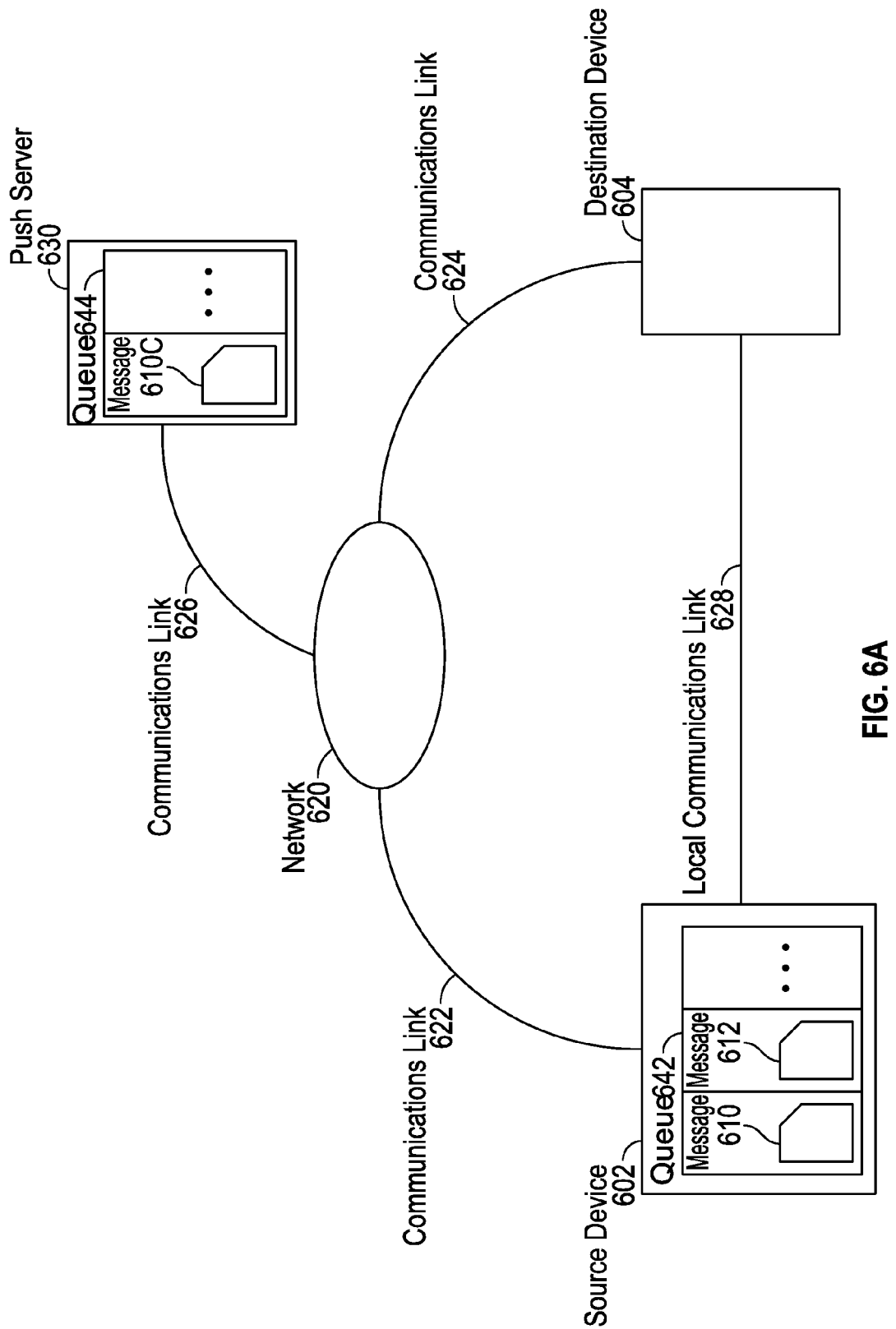
FIG. 6A illustrates an exemplary wireless device coupled to another wireless device and configured to send a plurality of messages through a local communications link and through a network and a push server according to examples of the disclosure.
Figure 6B:
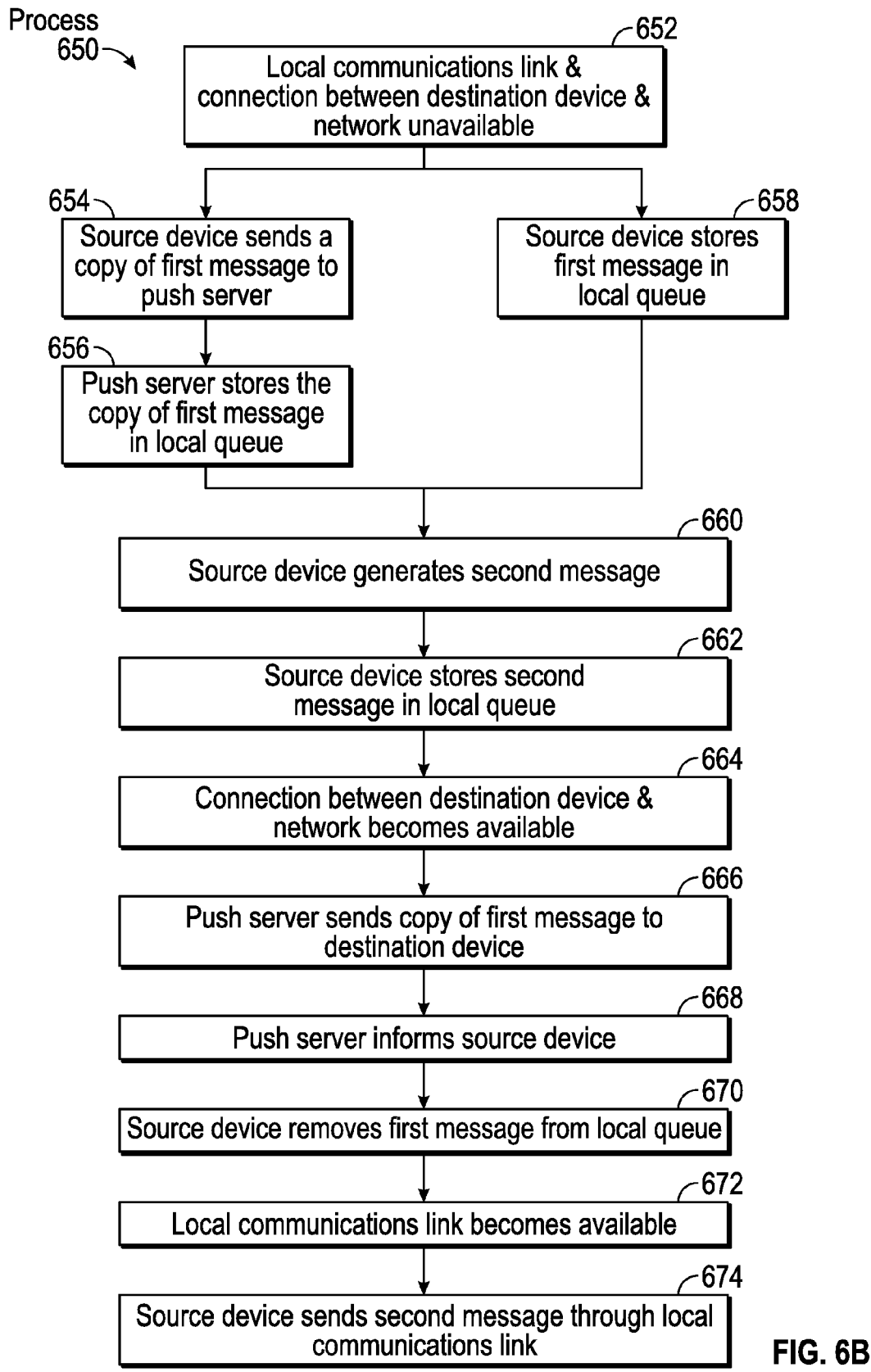
FIG. 6B illustrates an exemplary process for a wireless device coupled to another wireless device and configured to send a plurality of messages through a local communications link and through a network and a push server according to examples of the disclosure.

FIG. 6A illustrates an exemplary wireless device coupled to another wireless device and configured to send a plurality of messages through a local communications link and through a network and a push server according to examples of the disclosure, and FIG. 6B illustrates a corresponding exemplary process according to examples of the disclosure. Source device 602 can be coupled to destination device 604 through local communications link 628 and can be coupled to push server 630 and network 620 (through communications link 622, 624, and 626). Source device 602 may wish to send a first message 610 to destination device 604. However, local communications link 628 and communications link 624 can become unavailable in step 652 of process 650. As a result, destination device 604 may not have received message 610. In step 654, source device 602 can send a copy of message 610 (referred to as "message 610C") to push server 630 through network 620. Push server 630 can store message 610C in its local queue 644 in step 656, and source device 602 can store message 610 in its local queue 642 in step 658.

If source device 602 generates a second message 612 to send to destination device 604 before destination device 604 receives the first message 610 (step 660), source device 602 can store message 612 in its local queue 642 in step 662. Additionally, in some examples, the order that the messages 610 and 612 are received by destination device 604 (i.e., a receiving order) can be important. In such a situation, source device 602 can store messages 610 and 612 in its local queue 642 such that the messages are sent in the appropriate order. In some examples, source device 602 can send a copy of message 612 to push server 630, and push server can maintain the appropriate ordering. In some examples, to reduce server load, source device 602 may not send a copy of message 612 to push server 630.

If communications link 624 becomes available before local communications link 628 (step 664), push server 630 can send message 610C to destination device 604 in step 666. In order to avoid having destination device 604 receive duplicates of message 610, push server 630 can inform source device 602 that message 610C was sent in step 668. In response, source device 602 can remove message 610 from its local queue 642 in step 670. In step 672, source device 602 can wait for local communications link 628 to become available. In some examples, when source device 602 removes message 610 from its local queue 642, source device 602 can send message 612 or a copy of message 612 (referred to as "message 612C") to the push server 630. In step 674, source device 602 can send message 612 through local communications link 628. In some examples, either message 610 or message 610C (or both) can include an indication that message 610C is a duplicate of message 610. By sending messages 610 and 612 using any one of the examples, the order of delivery to destination device 604 can be ensured. In some examples, when source device 602 pushed a copy of both messages (e.g., messages 610C and 612C), the indication can be included in any one of the messages 610, 610C, 612, and 612C. In some examples, push server 630 can receive 610C and 612C while communications link 624 is unavailable, and push server 630 can discard 610C (i.e., coalescing notifications).

In some examples, ordered of delivery of messages 610 and 612 can be ensured using other techniques. For example, messages 610 and 612 can include an indication of the appropriate order. Although FIGS. 6A-6B illustrates two messages, examples of the disclosure can include any number of messages. Additionally, in some examples, one or more messages can have a preferred order while other messages can have any order. In some examples, messages generated by the source device can be too large to be transmitted in a single packet. In such a situation, the source device and/or push server can fragment the message into multiple packets. The multiple packets can be sent to the destination device in the appropriate order and/or the multiple packets can include an indication of the appropriate order. The destination device can then reconstruct the message using the received multiple packets. In some examples, destination device can reconstruct the message using TCP-like semantics.

Figure 7:
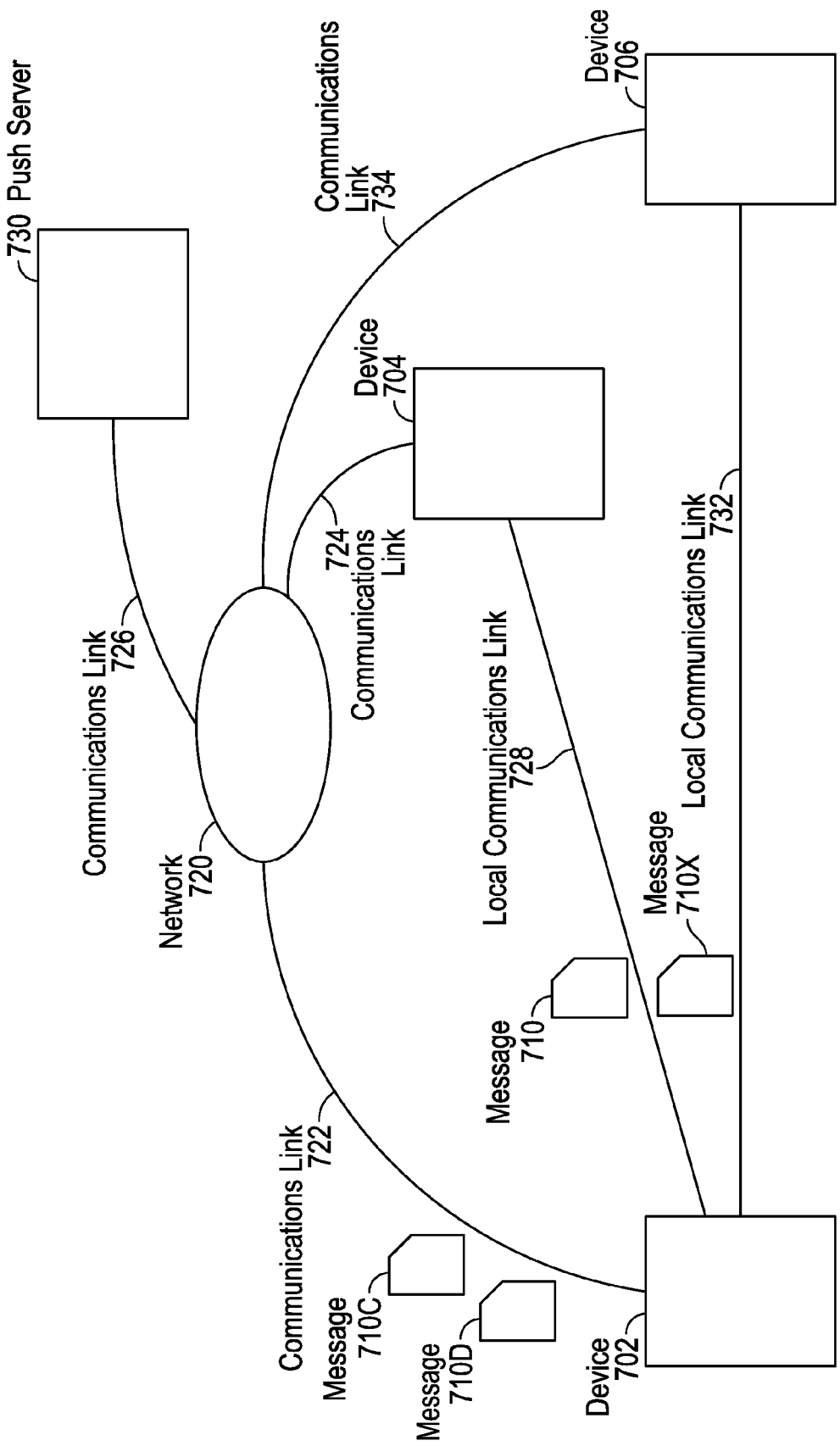
FIG. 7 illustrates an exemplary wireless device coupled to multiple wireless devices through local communications links and through a network and a push server according to examples of the disclosure.

FIG. 7 illustrates an exemplary wireless device coupled to multiple wireless devices through local communications links and through a network and a push server according to examples of the disclosure. Devices 702, 704, and 706 can be owned or registered to a user or a user account. Device 702 can be a source device, and devices 704 and 706 can be destination devices. Source device 702 can be coupled to destination device 704 through local communications link 728, and source device 702 can be coupled to destination device 706 through local communications link 732. Source device 702 can also be coupled to network 720 through communications link 722. Network 720 can be coupled to push server 730 through communications link 726. Destination device 704 can be coupled to network 720 through communications link 724, and destination device 706 can be coupled to network 720 through communications link 734. Source device 702 may wish to send message 710 to destination devices 704 and 706.

To send message 710 to both destination devices 704 and 706, multiple copies of message 710 can be made. If local communications link 728 is available, source device 702 can send message 710 to device 704. If local communications link 728 is unavailable or not suitable, source device 702 can send a copy of message 710 (referred to as "message 710C") to destination device 704 through network 720 and push server 730 using communications links 722, 726, and 724.

If local communications link 732 is available, source device 702 can send a copy of message 710 (referred to as "message 710X") to destination device 706 through local communications link 732. If local communications link is unavailable or not suitable, source device 702 can send a copy of message 710 (referred to as "message 710D") to destination device 706 through network 720 and push server 730 using communications links 722, 236, and 734.

By making multiple copies of message 710, source device 702 can ensure timely and orderly delivery of message 710 (or a copy of message 710) to the multiple destination devices 704 and 706. In such examples, if one or more of the communications links 728 and/or 724 are unavailable, delivery of message 710 (or message 710D) to destination device 706 can be unaffected. Similarly, if one or more of the communications link 732 and 734 are unavailable, delivery of message 710 (or message 710C) to destination device 704 can be unaffected. Additionally, if destination device 704 is coupled to a different set of devices than device 706, ordered delivery of messages to destination device 704 can be ensured and ordered delivery of messages to destination device 706 can be ensured.

Figure 8:
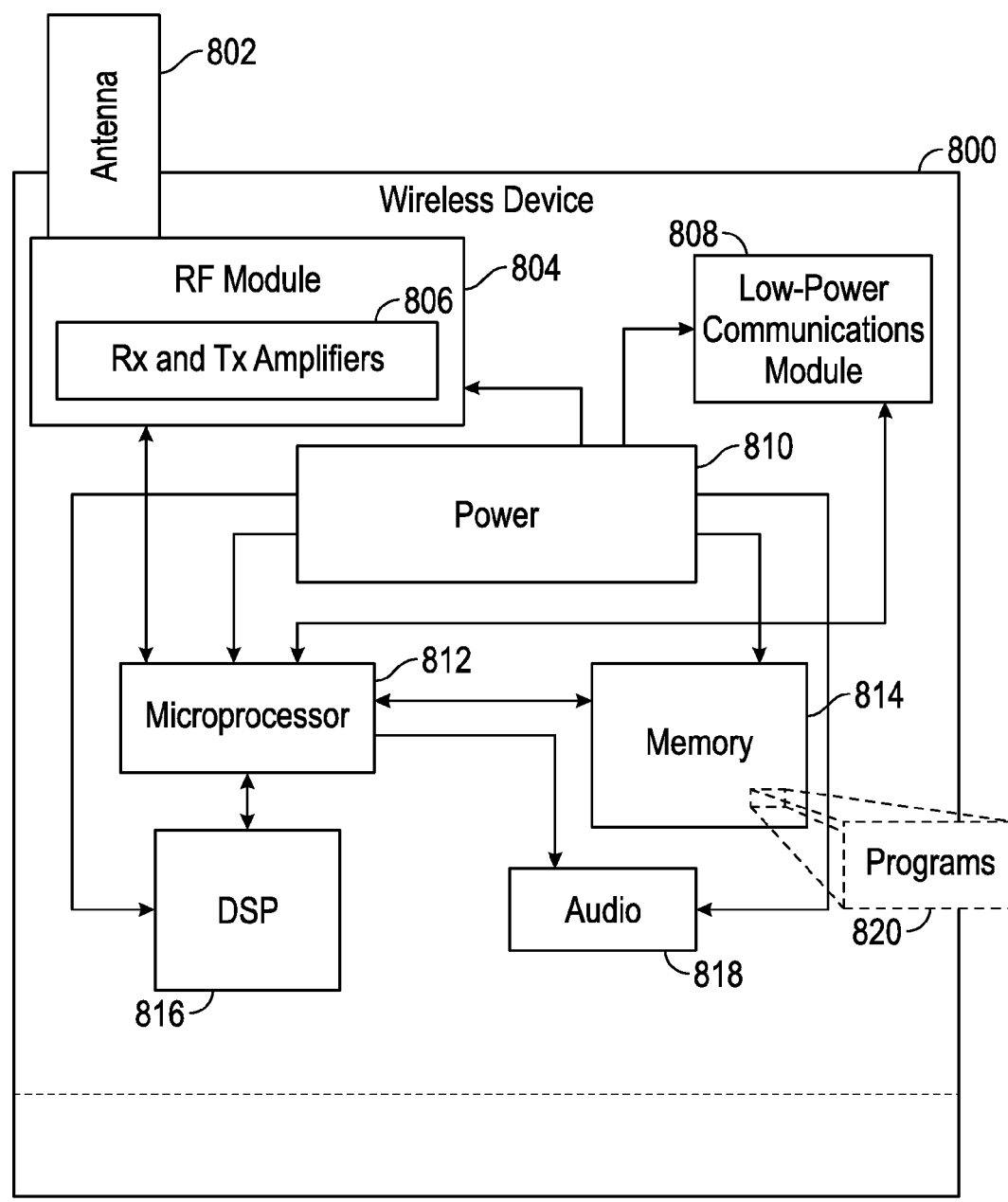
FIG. 8 illustrates an exemplary computing system that can be included in portable electronic device according to examples of the disclosure.

FIG. 8 illustrates an exemplary block diagram of a wireless device according to examples of the disclosure. Antenna 802 can be designed to emit and receive electromagnetic waves according to a wireless or air interface standard such as IEEE 802.11. In some examples, antenna 802 can be adapted to communicate with a wireless access point, which provides wireless device 800 with access to a broad network (e.g., the Internet). In some examples, RF module 804 can have a transceiver adapted to convert the electromagnetic waves to current and ultimately to digital data, and conversely the digital data to current and then to electromagnetic waves (as applicable). One or more receive and/or transmit amplifiers 806 can optionally be used to amplify signals for transmission, as is well known in the art. Wireless device 800 can also contain a low-power communications module 808 that can be configured to operate low power, near field communications with proximal devices. As an example, module 808 can be configured to communicate with other devices using Bluetooth LE.

The exemplary wireless device 800 of FIG. 8 can further have a central processing unit (such as integrated circuit microprocessor 812 and/or a digital signal processor (DSP), discussed below) which can adapt to perform basic processing operations of the wireless device 800. Memory 814 can have one or more storage devices capable of storing signals as bits of data. Memory 814 can therefore have any combination of volatile memory or non-volatile memory in according with the scope of the present application (for example, DRAM, SRAM, flash memory, EAROM, EPROM, EEPROM, and/or myriad types of memory modules).

Wireless device 800 can optionally include an audio controller 818 and one or more DSPs 816 for audio, signal, image and/or video processing. A power source 810 such as a battery provides power to the various components of wireless device 800.

In one example, microprocessor 816 can be adapted to execute one or more software programs 820 stored in memory 814. The term "programs" can be understood to mean software modules that include computer code to execute via a processor to operate the wireless device 800. Programs 820 can, upon detecting a specific control signal, modify the functionality of wireless device 800 according to the type of signal detected, or alternatively, by the contents of the signal provided (e.g., commands embedded within a WiFi beacon).

Note that one or more of the functions described above can be performed, for example, by firmware stored in memory 814 (e.g., one of the programs 820) and executed by microprocessor 812. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disk such as CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

FIGS. 9A-9C illustrate systems in which examples of the disclosure can be implemented. FIG. 9A illustrates an exemplary mobile telephone 936 that can include a touch screen 924. FIG. 9B illustrates an exemplary media player 940 that can include a touch screen 926. FIG. 9C illustrates an exemplary wearable device 944 that can include a touch screen 928 and can be attached to a user using a strap 946. The systems of FIGS. 9A-9C can utilize a unified message delivery according to examples of the disclosure.

Some of the examples of the disclosure are directed to a first device. The first device may comprise: a first transceiver configured for communicating through a first local communications link to a second device, wherein the first local communications link is at least one of a Bluetooth connection and a peer-to-peer WiFi connection; a second transceiver configured for communicating through a network and a communications link to a push server, wherein the communications link is at least one of a cellular network connection and a WiFi network connection; and a processor configured to determine whether the first local communications link is unavailable, and when the first local communications link is unavailable, to send a first copy of a first one or more messages through the network to the push server. Additionally or alternatively to one or more examples disclosed above, in other examples, when the first local communications link is available, the processor is further configured to retrieve the first one or more messages and sending the first one or more messages through the first local communications link. Additionally or alternatively to one or more examples disclosed above, in other examples, at least one of the first one or more messages and the first copy of the first one or more messages includes an indication of a duplicate message. Additionally or alternatively to one or more examples disclosed above, in other examples, the Bluetooth connection is at least one of a Bluetooth Classic protocol and a Bluetooth Low Energy protocol, and the peer-to-peer WiFi connection is at least one of a Wireless Direct Link, WiFi Direct, and a Tunneled Direct Link Setup connection. Additionally or alternatively to one or more examples disclosed above, in other examples, at least one of the first one or more messages and the first copy of the first one or more messages includes device association data. Additionally or alternatively to one or more examples disclosed above, in other examples, the processor is further configured to determine that the first copy of the first one or more messages was not sent to the second device, and upon such a determination, storing a second one or more messages. Additionally or alternatively to one or more examples disclosed above, in other examples, the processor is further configured to store the second one or more messages relative to the first one or more messages based on a receiving order. Additionally or alternatively to one or more examples disclosed above, in other examples, when the first local communications link is available, the processor is further configured to send the first one or more messages and second one or more messages through the first local communications link based on a receiving order. Additionally or alternatively to one or more examples disclosed above, in other examples, the processor is further configured to determine that the first copy of the first one or more messages was sent to the second device, and upon such a determination, determining if the first local communications link is available, and if the first local communications link is available, sending the second one or more messages through the first local communications link. Additionally or alternatively to one or more examples disclosed above, in other examples, the first transceiver is further configured for communicating through a second local communications link to a third device and the processor is further configured to determine whether the second local communications link is unavailable. Additionally or alternatively to one or more examples disclosed above, in other examples, when the second local communications link is unavailable, the processor is further configured to store a third copy of the first one or more messages and sending a fourth copy of the first one or more messages through the network to the push server.

Some examples of the disclosure are directed to a method of configuring a first device to communicate with a second device, the method comprising: determining whether communication through a first local communications link is unavailable; and sending a first copy of a first one or more messages through a network and a communications link to a server when the first local communications link is unavailable. Additionally or alternatively to one or more examples disclosed above, in other examples, the method further comprises: retrieving the first one or more messages and sending the first one or more messages through the first local communications link, when the first local communications link is available. Additionally or alternatively to one or more examples disclosed above, in other examples, the method further comprising: determining if the first copy of the first one or more message was not sent to the second device; and storing a second one or more messages upon such a determination. Additionally or alternatively to one or more examples disclosed above, in other examples, the method further comprises: storing the second one or more messages relative to the first one or more messages based on a receiving order. Additionally or alternatively to one or more examples disclosed above, in other examples, the method further comprises: sending the first one or more messages and the second one or more messages through the first local communications link based on a receiving order when the first communications link is available. Additionally or alternatively to one or more examples disclosed above, in other examples, the method further comprises: determining if the first copy of the first one or more messages was sent to the second device; determining if the first local communications link is available; and sending the second one or more messages through the first local communications link when the first local communications link is available. Additionally or alternatively to one or more examples disclosed above, in other examples, the first device is further configured for communicating with a third device through a second local communications link. Additionally or alternatively to one or more examples disclosed above, in other examples, the method further comprises: determining whether the second local communications link is unavailable; and storing a third copy of the first one or more messages and sending a fourth copy of the first one or more messages through the network to the server when the second local communications link is unavailable. Additionally or alternatively to one or more examples disclosed above, in other examples, the first local communications link is at least one of a Bluetooth Classic protocol, a Bluetooth Low Energy protocol, a Wireless Direct Link protocol, a WiFi Direct protocol, a Tunneled Direct Link Setup protocol, and a combination of at least two of the Bluetooth Classic, Bluetooth Low Energy, Wireless Direct Link, WiFi Direct, and Tunneled Direct Link Setup protocols.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A first device comprising:
   a first transceiver configured for communicating through a first local communications link to a second device, wherein the first local communications link is at least one of a Bluetooth connection and a peer-to-peer WiFi connection;
   a second transceiver configured for communicating through a network and a communications link to a push server, wherein the communications link is at least one of a cellular network connection and a WiFi network connection; and a processor configured to:
  determine whether the first local communications link is available for each data packet designated for transmission to the second device, wherein the determination is prior to transmitting a first one or more messages,
  transmit the first one or more messages through the first local communications link using the first transceiver when the first local communications link is available, and
  transmit a first copy of the first one or more messages through the network to the push server through the communications link using the second transceiver when the first local communications link is unavailable, and
  receive an acknowledgement message when the first one or more messages are received by the second device.

2. The first device of claim 1, wherein when the first local communications link becomes available, the processor is further configured to:
  retrieve the first one or more messages from a queue located on the first device and associated with both the first and second transceivers, and
  send the retrieved first one or more messages through the first local communications link.

3. The first device of claim 1, wherein at least one of the first one or more messages and the first copy of the first one or more messages includes an indication of a duplicate message.

4. The first device of claim 1, wherein the Bluetooth connection is at least one of a Bluetooth Classic protocol and a Bluetooth Low Energy protocol, and
  wherein the peer-to-peer WiFi connection is at least one of a Wireless Direct Link, WiFi Direct, and a Tunneled Direct Link Setup connection.

5. The first device of claim 1, wherein at least one of the first one or more messages and the first copy of the first one or more messages includes device association data indicative of a user account associated with the first and second devices.

6. The first device of claim 1, wherein the processor is further configured to determine that the first copy of the first one or more messages was not received by the second device, and upon such determination, store a second one or more messages relative to the first message based on a receiving order.

7. The first device of claim 6, wherein when the first local communications link becomes available, the processor is further configured to send the first one or more messages and second one or more messages through the first local communications link with the receiving order.

8. The first device of claim 1, wherein the first one or more messages are included in a single data packet.

9. The first device of claim 1, wherein the processor is further configured to determine whether the first copy of the first one or more messages was received by the second device, and upon such determination, determine if the first local communications link is available, and if the first local communications link is available, send the second one or more messages through the first local communications link.

10. The first device of claim 1, wherein the first transceiver is further configured for communicating through a second local communications link to a third device and the processor is further configured to determine whether the second local communications link is unavailable.

11. The first device of claim 10, wherein when the second local communications link is unavailable, the processor is further configured to:
  store a third copy of the first one or more messages in a queue located on the first device and associated with both first and second transceivers, and
  send a fourth copy of the first one or more messages through the network to the push server.

12. A method of configuring a first device to communicate with a second device, the first device coupled to a first processor separate and distinct from a second processor coupled to the second device, the method comprising:
  determining whether communication through a first local communications link is available for each data packet designated for transmission to the second device, wherein the determination is prior to transmitting a first one or more messages;
  transmitting the first one or more messages through the first local communications link using a first transceiver when the first local communications link is available; and
  transmitting a first copy of the first one or more messages through a network and a communications link to a server using a second transceiver when the first local communications link is unavailable, and
  receiving an acknowledgment message when the first one or more messages are received by the second device.

13. The method of claim 12, further comprising:
  retrieving the first one or more messages from a queue located on the first device and associated with both the first and second transceivers and sending the retrieved first one or more messages through the first local communications link, when the first local communications link is available.

14. The method of claim 12, further comprising:
  determining if the first copy of the first one or more message was not received by the second device; and
  storing a second one or more messages in a queue located on the first device and associated with both the first and second transceivers upon such determination.

15. The method of claim 14, wherein
  the second one or more messages are stored relative to the first one or more messages based on a receiving order.

16. The method of claim 15, further comprising:
  sending the first one or more messages and the second one or more messages through the first local communications link to the second device with the receiving order when the first communications local link becomes available.

17. The method of claim 12, further comprising:
  determining if the first copy of the first one or more messages was received by the second device;
  determining if the first local communications link is available; and
  waiting to send the second one or more messages until the first local communications link becomes available.

18. The method of claim 12, wherein the first device is further configured for communicating with a third device through a second local communications link.

19. The method of claim 18, further comprising:
  determining whether the second local communications link is available for each data packet designated for the third device;
  storing a third copy of the first one or more messages in a queue located on the first device and associated with both first and second transceivers when the second local communications link is unavailable; and sending a fourth copy of the first one or more messages through the network to the server when the second local communications link is unavailable.

20. The method of claim 12, wherein the first local communications link is at least one of a Bluetooth Classic protocol, a Bluetooth Low Energy protocol, a Wireless Direct Link protocol, a WiFi Direct protocol, a Tunneled Direct Link Setup protocol, and a combination of at least two of the Bluetooth Classic, Bluetooth Low Energy, Wireless Direct Link, WiFi Direct, and Tunneled Direct Link Setup protocols.

* * * * *